(12) United States Patent
Sakurai

(10) Patent No.: US 11,476,629 B2
(45) Date of Patent: Oct. 18, 2022

(54) LASER BEAM OUTPUT APPARATUS

(71) Applicant: ADVANTEST CORPORATION, Tokyo (JP)

(72) Inventor: Takao Sakurai, Miyagi (JP)

(73) Assignee: ADVANTEST CORPORATION, Tokyo (JP)

(*) Notice: Subject to any disclaimer, the term of this patent is extended or adjusted under 35 U.S.C. 154(b) by 54 days.

(21) Appl. No.: 17/199,819

(22) Filed: Mar. 12, 2021

(65) Prior Publication Data

US 2021/0305764 A1 Sep. 30, 2021

(30) Foreign Application Priority Data

Mar. 27, 2020 (JP) .............................. JP2020-057195

(51) Int. Cl.
*H01S 3/08* (2006.01)
*G02F 1/35* (2006.01)
*H01S 3/00* (2006.01)
*G02F 1/33* (2006.01)
*G02B 6/42* (2006.01)
(Continued)

(52) U.S. Cl.
CPC .......... *H01S 3/0092* (2013.01); *G02B 6/4296* (2013.01); *G02F 1/33* (2013.01); *G02F 1/3548* (2021.01); *G02F 1/39* (2013.01); *H01S 3/0071* (2013.01); *G02B 6/32* (2013.01);
(Continued)

(58) Field of Classification Search
CPC .......... G02F 1/113; G02F 1/33; G02F 1/3558; G02F 1/39; G02B 6/32; G02B 6/4296; G02B 27/1006; H01S 3/0092
See application file for complete search history.

(56) References Cited

U.S. PATENT DOCUMENTS

2010/0150185 A1* 6/2010 Collier .................. H01S 5/0687
372/20
2013/0202245 A1* 8/2013 Sakurai ................. G02F 1/3534
385/7
(Continued)

FOREIGN PATENT DOCUMENTS

DE          4240769 A1 *  6/1994  ............... G01P 5/26
EP          874426 A2 * 10/1998  ............ H01S 3/108
(Continued)

*Primary Examiner* — Daniel Petkovsek
(74) *Attorney, Agent, or Firm* — Greenblum & Bernstein, P.L.C.

(57) ABSTRACT

A pulsed laser output section outputs a laser beam having a predetermined wavelength as first pulses. An optical path determining section receives the first pulses and determines one among a plurality of optical paths for each of the first pulses for output. A parallelizing section parallelizes a traveling direction of light beams traveling, respectively, through the plurality of optical paths. A wavelength changing section receives outputs from the parallelizing section and changes the outputs to have different wavelengths for output. A focusing section receives and focuses outputs from the wavelength changing section. An optical fiber receives an output from the focusing section at a core end face. A timing control section is arranged to time outputs from the optical path determining section to the output of the first pulses. The focusing section is arranged to focus the outputs from the wavelength changing section on the core end face.

15 Claims, 16 Drawing Sheets

(51) Int. Cl.
  *G02F 1/39*     (2006.01)
  *G02F 1/355*    (2006.01)
  *G02B 27/10*    (2006.01)
  *G02F 1/11*     (2006.01)
  *G02B 6/32*     (2006.01)

(52) U.S. Cl.
  CPC ........ *G02B 6/4204* (2013.01); *G02B 27/1006* (2013.01); *G02F 1/113* (2013.01); *G02F 1/3558* (2013.01)

(56) References Cited

U.S. PATENT DOCUMENTS

2019/0041620 A1     2/2019  Mikami et al.
2020/0310220 A1*   10/2020  Sakurai ................. G02F 1/3551
2022/0171254 A1*    6/2022  Sakurai .................. G02F 1/295

FOREIGN PATENT DOCUMENTS

| FR | 3031246 A1 * | 7/2016 | ........... G02B 26/001 |
| JP | 2011-107094  | 6/2011 | |
| JP | 2016-101393  | 6/2016 | |
| WO | 2016/084720  | 6/2016 | |
| WO | 2017/138619  | 8/2017 | |

\* cited by examiner

LASER BEAM OUTPUT APPARATUS

BACKGROUND OF THE INVENTION

Field of the Invention

The present invention relates to outputting laser pulsed light of multiple wavelengths.

Description of the Related Art re has conventionally been known measuring (e.g. measuring blood oxygen saturation level) based on the response (e.g. the absorption coefficient) obtained by irradiating a to-be-measured object (e.g. living organism) with pulsed light. It has also been known that response from a to-be-measured object varies depending on the wavelength of pulsed light. It has hence been desired to irradiate a to-be-measured object with pulsed light of multiple wavelengths in terms of an increase in measurement accuracy. In this case, an increased amount of time between irradiation of a point P of a to-be-measured object with pulsed light of one wavelength and irradiation of the point P with pulsed light of another wavelength may give rise to a decrease in measurement accuracy due to movement (e.g. body movement) of the to-be-measured object.

However, there has not been known any technique of irradiation with pulsed light (one or more pulses of light) of one wavelength and immediately thereafter pulsed light (one or more pulses of light) of another wavelength. For example, Japanese Patent Application Publication No. 2011-107094, WO 2017/138619, and Japanese Patent Application Publication No. 2016-101393 describe multiplexing of laser beams having their respective different wavelengths, but not for the case of irradiation with pulsed light of one wavelength and immediately thereafter pulsed light of another wavelength.

SUMMARY OF THE INVENTION

It is hence an object of the present invention to provide for irradiation with pulsed light (one or more pulses of light) of one wavelength and immediately thereafter pulsed light (one or more pulses of light) of another wavelength.

According to the present invention, a laser beam output apparatus includes: a pulsed laser output section that outputs a laser beam having a predetermined wavelength as first pulses; an optical path determining section that receives the first pulses and determines one among a plurality of optical paths for each of the first pulses for output; a parallelizing section that parallelizes the traveling direction of light beams traveling, respectively, through the plurality of optical paths; a wavelength changing section that receives outputs from the parallelizing section and changes the outputs to have their respective different wavelengths for output; a focusing section that receives and focuses outputs from the wavelength changing section; and an optical fiber that receives an output from the focusing section at a core end face, wherein the focusing section is arranged to focus the outputs from the wavelength changing section on the core end face.

According to the thus constructed laser beam output apparatus, a pulsed laser output section outputs a laser beam having a predetermined wavelength as first pulses. An optical path determining section receives the first pulses and determines one among a plurality of optical paths for each of the first pulses for output. A parallelizing section parallelizes the traveling direction of light beams traveling, respectively, through the plurality of optical paths. A wavelength changing section receives outputs from the parallelizing section and changes the outputs to have their respective different wavelengths for output. A focusing section receives and focuses outputs from the wavelength changing section. An optical fiber receives an output from the focusing section at a core end face. The focusing section is arranged to focus the outputs from the wavelength changing section on the core end face.

According to the laser beam output apparatus of the present invention, the parallelizing section may be a convex lens.

According to the laser beam output apparatus of the present invention, one of outputs from the optical path determining section may pass through the optical axis of the parallelizing section.

According to the laser beam output apparatus of the present invention, the focusing section may be a convex lens.

According to the laser beam output apparatus of the present invention, the focusing section may be an achromatic lens.

According to the laser beam output apparatus of the present invention, the core end face may be positioned far from the focal point of the focusing section with respect to the focusing section.

According to the laser beam output apparatus of the present invention, $NA > Ymax/(2f)$, where f represents the focal length of the focusing section, Ymax represents the maximum distance between the outputs from the parallelizing section, and NA represents the numerical aperture of the optical fiber.

According to the laser beam output apparatus of the present invention, the wavelength changing section may have polarization reversed sections through which the outputs from the parallelizing section propagate, the polarization reversed sections arranged at predetermined spacing, and the predetermined spacing may vary depending on the outputs from the parallelizing section.

According to the laser beam output apparatus of the present invention, the wavelength changing section may have a non-linear optical crystal substrate with the polarization reversed sections formed thereon, and the graphical centers of the polarization reversed sections may be arranged on a straight line parallel to the X axis of the non-linear optical crystal substrate.

According to the laser beam output apparatus of the present invention, the wavelength changing section may have a single non-linear optical crystal substrate with all of the polarization reversed sections formed thereon.

According to the laser beam output apparatus of the present invention, all of the outputs from the parallelizing section may pass through shared polarization reversed sections.

According to the laser beam output apparatus of the present invention, the wavelength changing section may have a non-linear optical crystal substrate with the polarization reversed sections formed thereon, and the non-linear optical crystal substrate may be provided for each of the outputs from the parallelizing section propagating therethrough.

According to the present invention, the laser beam output apparatus may further include a timing control section arranged to time the outputs from the optical path determining section to the output of the first pulses.

According to the laser beam output apparatus of the present invention, the optical path determining section may have: a first acousto-optical modulator arranged to receive the first pulses and determine one among a plurality of optical paths for each of the first pulses for output; and a second acousto-optical modulator arranged to receive output pulses from the first acousto-optical modulator and determine one among one or more optical paths for each of the output pulses from the first acousto-optical modulator for output.

According to the laser beam output apparatus of the present invention, the first acousto-optical modulator may be arranged to diffract or directly advance each of the first pulses for output, and the second acousto-optical modulator may be arranged to receive and diffract or directly advance the directly advanced ones of the first pulses for output, while receive and directly advance the diffracted ones of the first pulses for output.

According to the laser beam output apparatus of the present invention, the first acousto-optical modulator may be arranged to diffract or directly advance each of the first pulses for output, and the second acousto-optical modulator may be arranged to receive and diffract or directly advance the diffracted ones of the first pulses for output, while receive and directly advance the directly advanced ones of the first pulses for output.

DESCRIPTION OF THE PREFERRED EMBODIMENTS

Preferred embodiments of the present invention will hereinafter be described with reference to the accompanying drawings.

First Embodiment

Figure 1:
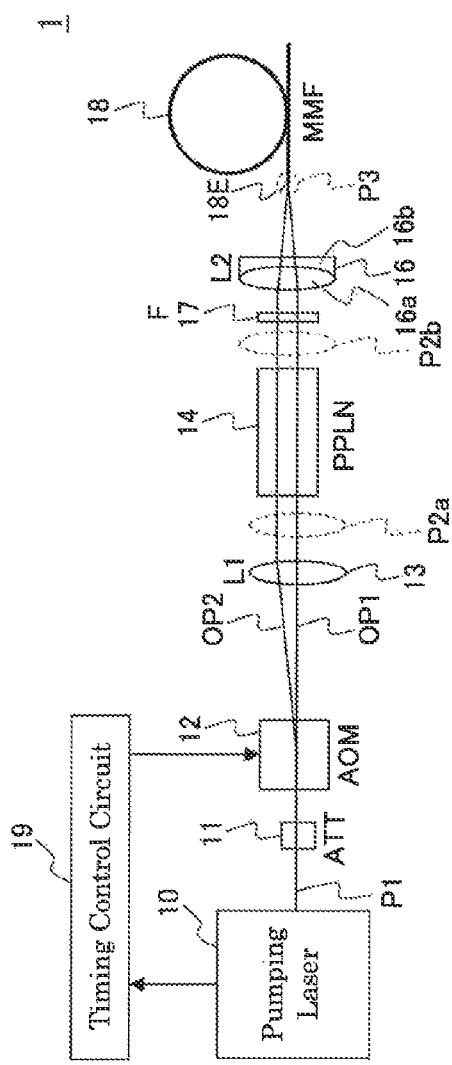
FIG. 1 shows a configuration of a laser beam output apparatus 1 according to a first embodiment.
Figure 2:
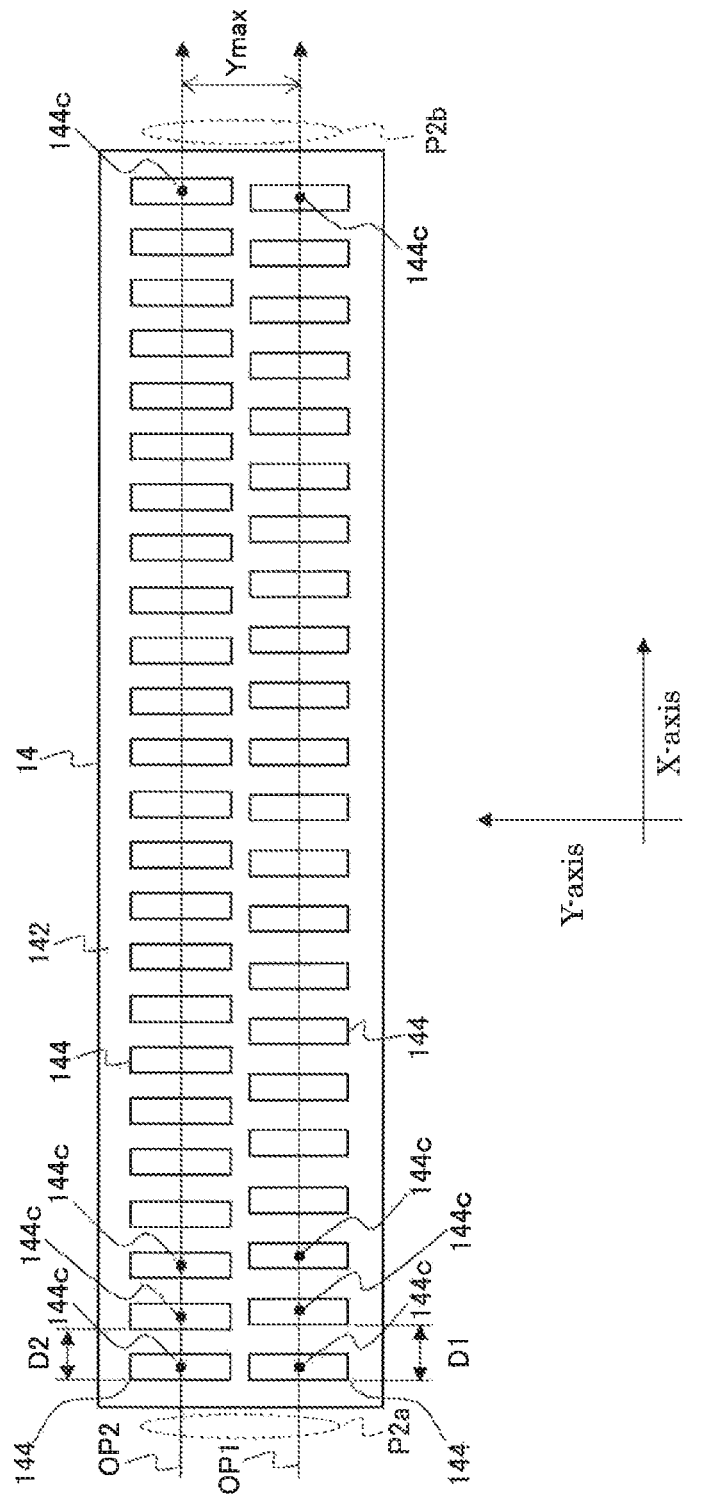
FIG. 2 is a plan view of a wavelength changing section 14 according to the first embodiment.
Figure 3:
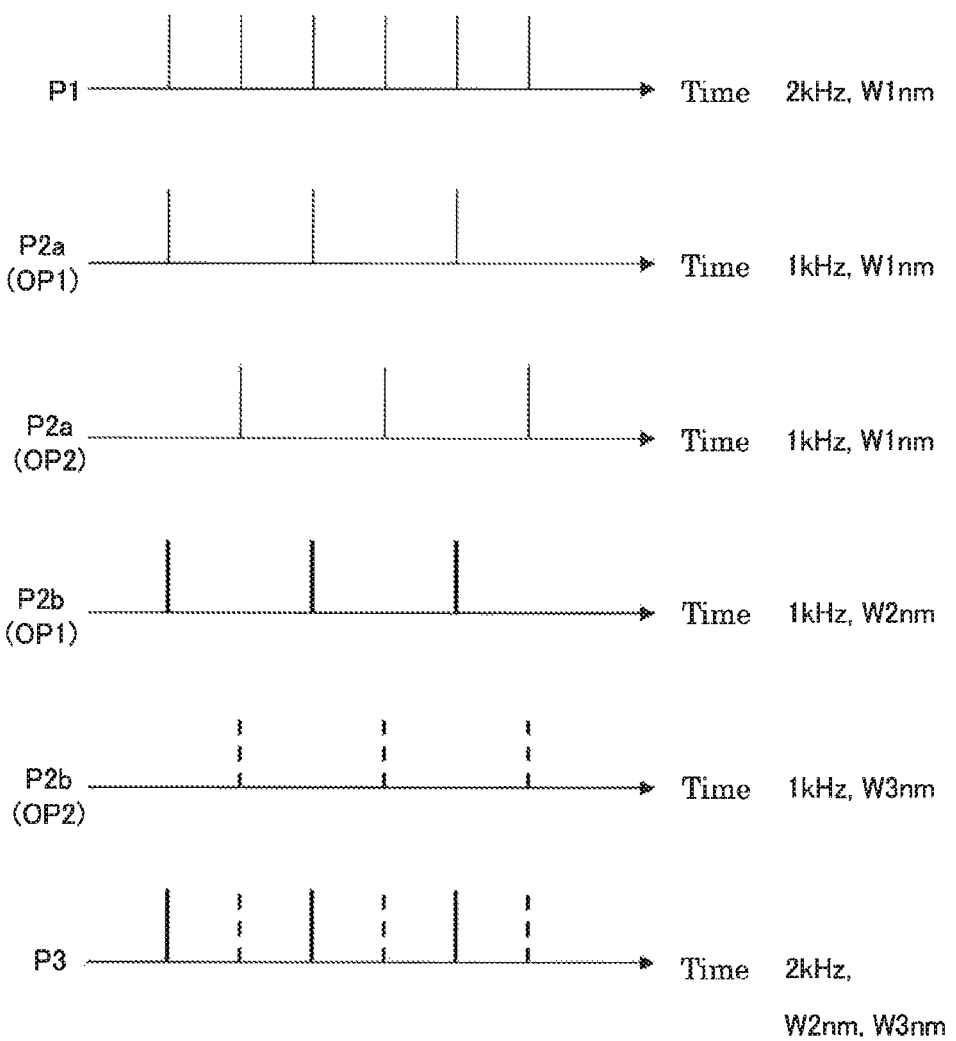
FIG. 3 shows timing charts of first pulses P1, second pulses (before wavelength conversion) P2a, second pulses (after wavelength conversion) P2b, and third pulses P3 according to the first embodiment.

FIG. 1 shows a configuration of a laser beam output apparatus 1 according to a first embodiment. FIG. 2 is a plan view of a wavelength changing section 14 according to the first embodiment. FIG. 3 shows timing charts of first pulses P1, second pulses (before wavelength conversion) P2a, second pulses (after wavelength conversion) P2b, and third pulses P3 according to the first embodiment. It is noted that in FIG. 3, the thickness and type (solid or broken) of lines indicating the pulses vary depending on the wavelength.

The laser beam output apparatus 1 according to the first embodiment includes a pumping laser (pulsed laser output section) 10, an optical attenuator (ATT) 11, an acousto-optical modulator (optical path determining section) (AOM) 12, a convex lens (parallelizing section) (L1) 13, a wavelength changing section (PPLN) 14, an achromatic lens (focusing section) (L2) 16, a filter (F) 17, an optical fiber (MMF) 18, and a timing control circuit (timing control section) 19.

The pumping laser (pulsed laser output section) 10 is arranged to output a laser beam having a predetermined wavelength W1 [nm] as first pulses P1 having a predetermined frequency (e.g. 2 kHz) (see FIG. 3). The pumping laser 10 is, for example, a Yb:YAG laser.

The optical attenuator (ATT) 11 is arranged to attenuate and provide the first pulses P1 to the acousto-optical modulator 12.

The acousto-optical modulator (optical path determining section) (AOM) 12 is arranged to receive the first pulses P1 and determine one among multiple optical paths OP1, OP2 for each of the first pulses P1 for output.

For example, with reference to FIGS. 1 and 3, at the time the acousto-optical modulator 12 receives odd-numbered (1st, 3rd, 5th . . . ) ones of the first pulses P1, no acoustic wave is provided to the acousto-optical modulator 12. The odd-numbered ones of the first pulses P1 then directly go straight through the acousto-optical modulator 12 (optical path OP1).

On the other hand, at the time the acousto-optical modulator 12 receives even-numbered (2nd, 4th, 6th . . . ) ones of the first pulses P1, an acoustic wave (with an angular frequency ω2) is provided to the acousto-optical modulator 12. The even-numbered ones of the first pulses P1 then go through the acousto-optical modulator 12 with some degree of diffraction (optical path OP2).

Note, however, that at the time the acousto-optical modulator 12 receives odd-numbered ones of the first pulses P1, an acoustic wave (with an angular frequency ω1, which is different from ω2) may be provided to the acousto-optical modulator 12.

This causes the acousto-optical modulator 12 to output, respectively on the multiple optical paths OP1, OP2, pulses having a frequency (1 kHz) obtained by dividing the predetermined frequency (e.g. 2 kHz) by the number (two) of the multiple optical paths and having their respective 180-degree different phases.

The timing control circuit (timing control section) 19 is arranged to time an output from the acousto-optical modulator 12 to an output of the first pulses P1. The result of timing has heretofore been described with reference to FIG. 3. It is noted that the timing control circuit 19 is arranged to receive a signal in synchronization with the timing of the output of the first pulses P1 from the pumping laser (pulsed laser output section) 10 and, based on this signal, control the timing of the output from the acousto-optical modulator 12.

The convex lens (parallelizing section) (L1) 13 is arranged to parallelize the traveling direction of light beams traveling, respectively, through the multiple optical paths OP1, OP2. It is noted that the parallelizing section may employ a prism instead of the convex lens 13.

It is noted that Ymax defining the maximum distance between outputs from the convex lens (parallelizing section) 13 represents the distance between the optical paths OP1 and OP2 extending from the convex lens 13 to the achromatic lens 16 (see FIG. 2).

The wavelength changing section (PPLN) 14 is arranged to receive outputs from the convex lens (parallelizing section) 13, that is, light beams (i.e. second pulses P2a) traveling, respectively, through the multiple optical paths OP1, OP2 and then going through the convex lens 13 and to change the light beams to have their respective different wavelengths for output. The wavelength changing section 14 outputs second pulses (after wavelength conversion) P2b.

It is noted that one of the outputs from the acousto-optical modulator 12 (e.g. one traveling through the optical path OP1) may pass through the optical axis of the convex lens 13. In this case, the convex lens 13 is arranged not to change the traveling direction of light beams traveling through the optical path OP1, but to change the traveling direction of light beams traveling through the optical path OP2 to be in parallel to the optical path OP1.

With reference to FIG. 3, the wavelength changing section 14 is arranged to receive and convert ones (wavelength W1 [nm]) of the second pulses P2a traveling through the optical path OP1 into second pulses P2b (wavelength W2 [nm]). The wavelength changing section 14 is also arranged to receive and convert ones (wavelength W1 [nm]) of the second pulses P2a traveling through the optical path OP2 into second pulses P2b (wavelength W3 [nm]).

With reference to FIG. 2, the wavelength changing section 14 has an LN crystal substrate 142 and polarization reversed sections 144. It is noted that in FIG. 2, like FIG. 1, the X-axis direction of the LN crystal substrate 142 is shown in parallel to the landscape orientation of the drawing sheet.

The polarization reversed sections 144 are arranged such that outputs from the convex lens 13 (i.e. second pulses P2a) propagate therethrough. The polarization reversed sections 144 include ones through which the second pulses P2a traveling through the optical path OP1 propagate and the others through which the second pulses P2a traveling through the optical path OP2 propagate. It is noted that the polarization reversed sections 144 are made of PPLN (peri-odically polarization-reversed lithium niobate) in FIG. 2, but not limited thereto and may be made of, for example, PPLT (lithium tantalate) or PPKTP.

The polarization reversed sections 144 through which the second pulses P2a traveling through the optical path OP1 propagate are arranged at predetermined spacing D1. The polarization reversed sections 144 through which the second pulses P2a traveling through the optical path OP2 propagate are arranged at predetermined spacing D2. The predetermined spacing varies depending on the outputs from the convex lens 13. That is, the predetermined spacing D1 is different from the predetermined spacing D2.

The polarization reversed sections 144 are formed in the LN crystal substrate 142. All of the polarization reversed sections 144 are formed in the single LN crystal substrate 142. It is noted that in the first embodiment, the LN crystal substrate 142 may not be an LN crystal substrate as long as being a non-linear optical crystal substrate. This applies to other embodiments, in which a non-linear optical crystal substrate can be used instead of such an LN crystal substrate.

The graphical centers 144c of the polarization reversed sections 144 through which the second pulses P2a traveling through the optical path OP1 propagate are arranged on a straight line parallel to the X axis of the LN crystal substrate 142. The graphical centers 144c of the polarization reversed sections 144 through which the second pulses P2a traveling through the optical path OP2 propagate are also arranged on a straight line parallel to the X axis of the LN crystal substrate 142. It is noted that the graphical centers 144c of the polarization reversed sections 144 correspond to the centers of gravity with the assumption that the gravity acts uniformly on each polarization reversed section 144.

It is noted that in addition to the second pulses P2b, a laser beam (pump beam) output from the pumping laser 10 and having a wavelength W1 [nm] and an infrared idler beam originating from the wavelength changing section 14 are also mixed into the output from the wavelength changing section 14. It is noted that the wavelength changing section 14, when applied with a laser beam (pump beam), generates a signal beam and such an idler beam as described above due to optical parametric oscillation. The signal beam is thus output from the wavelength changing section 14 (as second pulses (after wavelength conversion) P2b) (the same applies to wavelength changing sections according to other embodiments).

The filter (F) 17 is arranged to remove the pump beam and the idler beam from the second pulses P2b for provision to the achromatic lens 16.

The achromatic lens (focusing section) (L2) 16 is arranged to receive and focus outputs from the wavelength changing section 14 via the filter 17. The achromatic lens 16 has a convex lens 16a and a concave lens 16b. The convex lens 16a is arranged at a position closer to the pumping laser 10 than the concave lens 16b. The convex surface of the convex lens 16a is in contact with the concave surface of the concave lens 16b.

The achromatic lens 16 is used to reduce the difference in the focal length (chromatic aberration) due to the difference in the wavelength between the second pulses P2b (wavelength W2 [nm]) (traveling through the optical path OP1) and the second pulses P2b (wavelength W3 [nm]) (traveling through the optical path OP2).

It is noted that when the difference between the wavelength W2 [nm] and the wavelength W3 [nm] is small, the focusing section may employ a single convex lens 16a instead of the achromatic lens 16.

Figure 4:
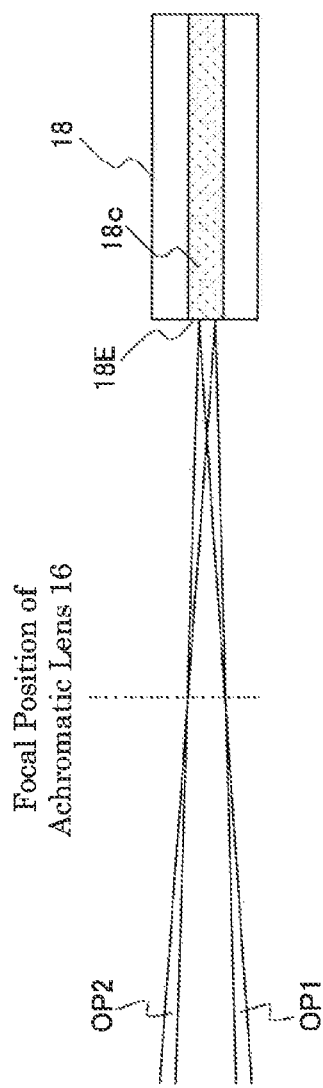
FIG. 4 is an enlarged cross-sectional view in the vicinity of an end face 18E of the core 18c of the optical fiber 18 in the first embodiment.

FIG. 4 is an enlarged cross-sectional view in the vicinity of an end face 18E of the core 18c of the optical fiber 18 in the first embodiment. The optical fiber (MMF) 18 has the core 18c, and the core 18c has the end face 18E. The optical fiber 18 is arranged to receive outputs from the achromatic lens 16 at the end face 18E of the core 18c. The achromatic lens 16 is arranged to focus the outputs from the wavelength changing section 14 on the end face 18E of the core 18c.

In order to focus the outputs from the wavelength changing section 14 on the end face 18E of the core 18c, it is preferred that NA>Ymax/(2f), where f represents the focal length of the achromatic lens 16 and NA represents the numerical aperture of the optical fiber 18.

In FIG. 4, the achromatic lens 16 is arranged to the left of its focal position, though not shown. The end face 18E of the core 18c is positioned far from the focal point of the achromatic lens 16 with respect to the achromatic lens 16.

Since the Y-coordinate of the second pulses P2b (wavelength W2 [nm]) (traveling through the optical path OP1) is different from the Y-coordinate of the second pulses P2b (wavelength W3 [nm]) (traveling through the optical path OP2), the focal position of the achromatic lens 16 for the second pulses P2b (wavelength W2 [nm]) (traveling through the optical path OP1) is not aligned vertically (in the Y-axis direction) with the focal position of the achromatic lens 16 for the second pulses P2b (wavelength W3 [nm]) (traveling through the optical path OP2). However, far from the focal point of the achromatic lens 16 with respect to the achromatic lens 16, there is a position where the second pulses P2b traveling through the optical path OP1 meet the second pulses P2b traveling through the optical path OP2. Accordingly, arranging the end face 18E of the core 18c at such a position allows to focus the outputs from the wavelength changing section 14 on the end face 18E of the core 18c.

The optical fiber (MMF) 18 is arranged to cause the outputs from the wavelength changing section 14 focused on the end face 18E of the core 18c to be output through the other end (third pulses P3) (see FIG. 3).

Next will be described an operation according to the first embodiment.

The pumping laser 10 first outputs a laser beam having a predetermined wavelength W1 [nm] as first pulses P1 having a predetermined frequency (e.g. 2 kHz) (see FIG. 3). The first pulses P1 are attenuated through the optical attenuator 11 and provided to the acousto-optical modulator 12. The timing control circuit 19 controls the timing of the output from the acousto-optical modulator 12 (see FIG. 3).

At the time the acousto-optical modulator 12 receives odd-numbered (1st, 3rd, 5th . . . ) ones of the first pulses P1, no acoustic wave is provided to the acousto-optical modulator 12. This causes the odd-numbered ones of the first pulses P1 to directly go straight through the acousto-optical modulator 12 (optical path OP1). This causes light beams traveling through the optical path OP1 to go straight through the convex lens 13 in its optical axis direction to be second pulses (before wavelength conversion) P2a having a frequency (1 kHz) obtained by dividing the predetermined frequency (e.g. 2 kHz) by the number (two) of the multiple optical paths.

At the time the acousto-optical modulator 12 receives even-numbered (2nd, 4th, 6th . . . ) ones of the first pulses P1, an acoustic wave (with an angular frequency ω2) is provided to the acousto-optical modulator 12. This causes the even-numbered ones of the first pulses P1 to go through the acousto-optical modulator 12 with some degree of diffraction (optical path OP2). This causes light beams traveling through the optical path OP2 to go through the convex lens 13 while traveling into parallel to the optical path OP1 to be second pulses (before wavelength conversion) P2a having a frequency (1 kHz) obtained by dividing the predetermined frequency (e.g. 2 kHz) by the number (two) of the multiple optical paths.

In addition, the phase of the light beams traveling through the optical path OP1 and going through the convex lens 13 (second pulses (before wavelength conversion) P2a) is 180-degree different from the phase of the light beams traveling through the optical path OP2 and going through the convex lens 13 (second pulses (before wavelength conversion) P2a).

The light beams traveling through the optical path OP1 and going through the convex lens 13 (second pulses (before wavelength conversion) P2a, with a wavelength W1 [nm]) propagate through the polarization reserved sections 144, which are arranged at the predetermined spacing D1 in the wavelength changing section 14, to undergo wavelength conversion into w2 [nm], and travel through the filter 17 for removal of the pump beam and the idler beam and then provided to the achromatic lens 16 as second pulses (after wavelength conversion) P2b.

The light beams traveling through the optical path OP2 and going through the convex lens 13 (second pulses (before wavelength conversion) P2a, with a wavelength W1 [nm]) propagate through the polarization reserved sections 144, which are arranged at the predetermined spacing D2 in the wavelength changing section 14, to undergo wavelength conversion into w3 [nm], and travel through the filter 17 for removal of the pump beam and the idler beam and then provided to the achromatic lens 16 as second pulses (after wavelength conversion) P2b.

Ones of the second pulses (after wavelength conversion) P2b output from the wavelength changing section 14 and having the wavelength W2 [nm] and the wavelength W3 [nm] are focused through the achromatic lens 16 onto the end face 18E of the core 18c of the optical fiber 18 to be third pulses P3 having a predetermined frequency (2 kHz).

The third pulses P3 are output through the other end of the optical fiber 18.

In accordance with the first embodiment, the third pulses P3 can be output from the optical fiber 18. The third pulses P3 provides for irradiation with pulsed light of the wavelength W2 [nm] and immediately thereafter (e.g. after 500 microseconds) pulsed light of the different wavelength W3 [nm]. That is, the first embodiment allows for irradiation with pulsed light of one wavelength and immediately thereafter pulsed light of another wavelength.

In addition, in accordance with the first embodiment, no multiplexer (e.g. dichroic mirror) is required to multiplex ones of the second pulses (after wavelength conversion) P2b output from the wavelength changing section 14 and having the wavelength W2 [nm] and the wavelength W3 [nm]. While it is difficult, with a dichroic mirror, to adjust the optical axis and accommodate the change in the wavelength W2 [nm] and the wavelength W3 [nm] of the second pulses (after wavelength conversion) P2b, such an effort can be reduced if no dichroic mirror is required.

Second Embodiment

The laser beam output apparatus 1 according to the second embodiment is arranged such that LN crystal substrates are provided for the respective traveling light beams that propagate, which differs from the laser beam output apparatus 1 according to the first embodiment in which the single LN crystal substrate 142 is provided.

Figure 5:
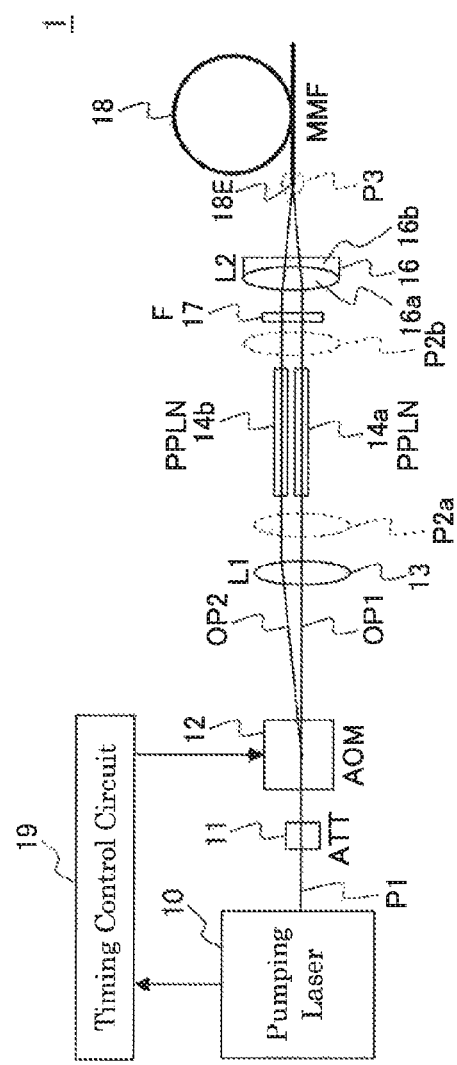
FIG. 5 shows a configuration of the laser beam output apparatus 1 according to the second embodiment.

FIG. 5 shows a configuration of the laser beam output apparatus 1 according to the second embodiment. The laser beam output apparatus 1 according to the second embodiment includes a pumping laser (pulsed laser output section) 10, an optical attenuator (ATT) 11, an acousto-optical modulator (optical path determining section) (AOM) 12, a convex lens (parallelizing section) (L1) 13, wavelength changing sections (PPLN) 14a, 14b, an achromatic lens (focusing section) (L2) 16, a filter (F) 17, an optical fiber (MMF) 18, and a timing control circuit (timing control section) 19. Components identical to those in the first embodiment will hereinafter be designated by the same reference signs to omit the description thereof.

The pumping laser (pulsed laser output section) 10, the optical attenuator (ATT) 11, the acousto-optical modulator (optical path determining section) (AOM) 12, the convex lens (parallelizing section) (L1) 13, the achromatic lens (focusing section) (L2) 16, the filter (F) 17, the optical fiber (MMF) 18, and the timing control circuit (timing control section) 19 are identical to those in the first embodiment, and the description thereof will be omitted.

The wavelength changing section (PPLN) 14a is arranged to receive from the acousto-optical modulator 12 via the convex lens 13 and convert ones (wavelength W1 [nm]) of the second pulses P2a traveling through the optical path OP1 into second pulses P2b (wavelength W2 [nm]). The arrangement of the wavelength changing section 14a corresponds to the polarization reversed sections 144 arranged at the predetermined spacing D1 and the LN crystal substrate 142 in which the polarization reversed sections 144 are formed as shown in FIG. 2.

The wavelength changing section (PPLN) 14b is arranged to receive from the acousto-optical modulator 12 via the convex lens 13 and convert ones (wavelength W1 [nm]) of the second pulses P2a traveling through the optical path OP2 into second pulses P2b (wavelength W3 [nm]). The arrangement of the wavelength changing section 14b corresponds to the polarization reversed sections 144 arranged at the predetermined spacing D2 and the LN crystal substrate 142 in which the polarization reversed sections 144 are formed as shown in FIG. 2.

It is noted that the LN crystal substrate that the wavelength changing section 14a has is not identical to the LN crystal substrate that the wavelength changing section 14b has. That is, the LN crystal substrate that the wavelength changing section 14a has and the LN crystal substrate that the wavelength changing section 14b has are provided, respectively, for the outputs from the convex lens 13 (traveling through the optical path OP1 and the optical path OP2) that propagate therethrough.

Since the operation of the second embodiment is identical to that of the first embodiment, the description thereof will be omitted.

In accordance with the second embodiment, the LN crystal substrates are provided, respectively, for the light beams (traveling through the optical path OP1 and the optical path OP2) that propagate therethrough, whereby conditions of manufacture for the polarization reversed sections 144 can be set according to the predetermined spacing D1, D2, which makes it easy to manufacture the wavelength changing sections 14a, 14b.

Third Embodiment

The laser beam output apparatus 1 according to the third embodiment differs from the laser beam output apparatus 1 according to the first embodiment in that an acousto-optical deflector (AOD) (optical path determining section) 120 is used instead of the acousto-optical modulator (AOM) (optical path determining section) 12.

Figure 6:
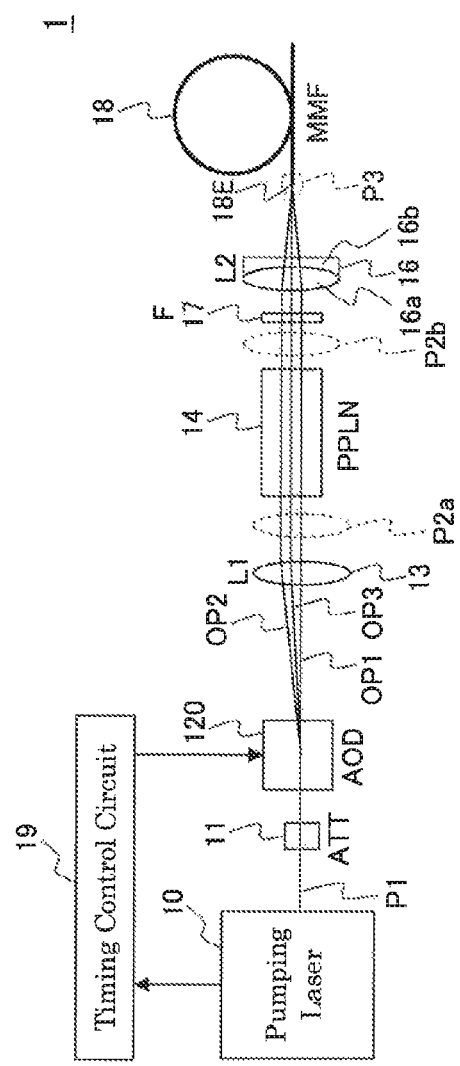
FIG. 6 shows a configuration of the laser beam output apparatus 1 according to the third embodiment.
Figure 7:
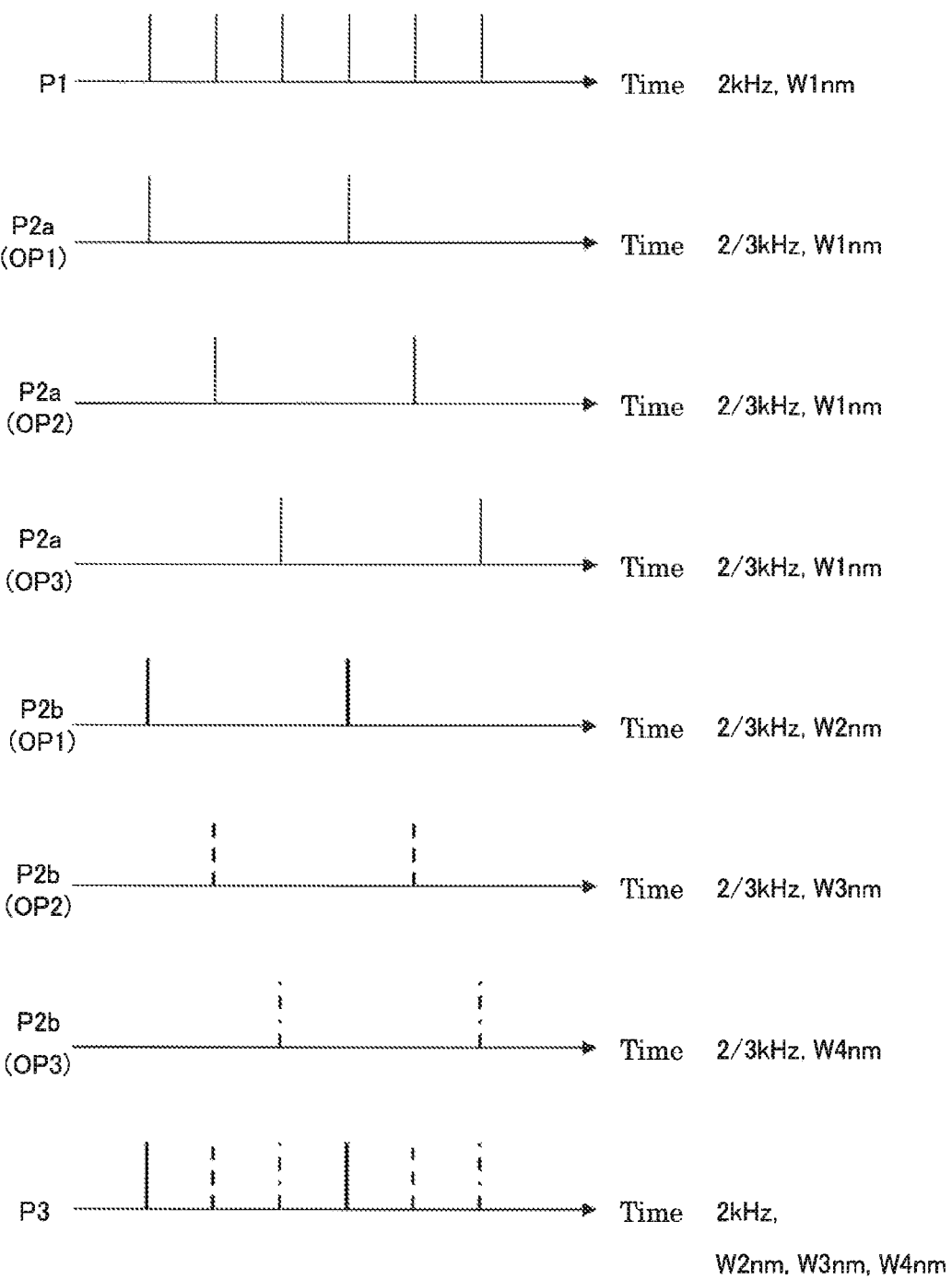
FIG. 7 shows timing charts of first pulses P1, second pulses (before wavelength conversion) P2a, second pulses (after wavelength conversion) P2b, and third pulses P3 according to the third embodiment.

FIG. 6 shows a configuration of the laser beam output apparatus 1 according to the third embodiment. FIG. 7 shows timing charts of first pulses P1, second pulses (before wavelength conversion) P2a, second pulses (after wavelength conversion) P2b, and third pulses P3 according to the third embodiment. It is noted that in FIG. 7, the thickness and type (solid, broken, or alternate long and short dash) of lines indicating the pulses vary depending on the wavelength.

The laser beam output apparatus 1 according to the third embodiment includes a pumping laser (pulsed laser output section) 10, an optical attenuator (ATT) 11, an acousto-optical deflector (AOD) (optical path determining section) 120, a convex lens (parallelizing section) (L1) 13, a wavelength changing section (PPLN) 14, an achromatic lens (focusing section) (L2) 16, a filter (F) 17, an optical fiber (MMF) 18, and a timing control circuit (timing control section) 19. Components identical to those in the first embodiment will hereinafter be designated by the same reference signs to omit the description thereof.

The pumping laser (pulsed laser output section) 10, the optical attenuator (ATT) 11, and the timing control circuit (timing control section) 19 are identical to those in the first embodiment, and the description thereof will be omitted. Note, however, that the timing control circuit 19 controls the timing of the output from the acousto-optical deflector 120 (see FIG. 7).

The acousto-optical deflector (AOD) (optical path determining section) 120 is arranged to receive the first pulses P1 and determine one among multiple optical paths OP1, OP2, OP3 for each of the first pulses P1 for output.

For example, with reference to FIGS. 6 and 7, at the time the acousto-optical deflector 120 receives (1+3N)-numbered (1st, 4th, 7th . . . ) ones (where N represents an integer equal to or greater than 0) of the first pulses P1, no acoustic wave is provided to the acousto-optical deflector 120. The (1+3N)-numbered ones of the first pulses P1 then directly go straight through the acousto-optical deflector 120 (optical path OP1).

On the other hand, at the time the acousto-optical deflector 120 receives (2+3N)-numbered (2nd, 5th, 8th . . . ) ones of the first pulses P1, an acoustic wave (with an angular frequency ω2) is provided to the acousto-optical deflector 120. The (2+3N)-numbered ones of the first pulses P1 then go through the acousto-optical deflector 120 with some degree of diffraction (optical path OP2).

At the time the acousto-optical deflector 120 receives (3+3N)-numbered (3rd, 6th, 9th . . . ) ones of the first pulses P1, an acoustic wave (with an angular frequency ω3, which is different from ω2) is also provided to the acousto-optical deflector 120. The (3+3N)-numbered ones of the first pulses P1 then go through the acousto-optical deflector 120 with some degree of diffraction (optical path OP3). Note, however, that the angle between the optical path OP3 and the optical path OP1 (smaller than 90 degrees) is smaller than the angle between the optical path OP2 and the optical path OP1 (smaller than 90 degrees).

It is noted that at the time the acousto-optical deflector 120 receives (1+3N)-numbered ones of the first pulses P1, an acoustic wave (with an angular frequency ω1, which is different from ω2 and ω3) may be provided to the acousto-optical deflector 120.

This causes the acousto-optical deflector 120 to output, respectively, on the multiple optical paths OP1, OP2, OP3, pulses having a frequency (⅔ kHz) obtained by dividing the predetermined frequency (e.g. 2 kHz) by the number (three) of the multiple optical paths and having their respective 120-degree different phases.

The convex lens (parallelizing section) (L1) 13 is arranged to parallelize the traveling direction of light beams traveling, respectively, through the multiple optical paths OP1, OP2, and OP3. It is noted that the parallelizing section may employ a prism instead of the convex lens 13.

Figure 13:
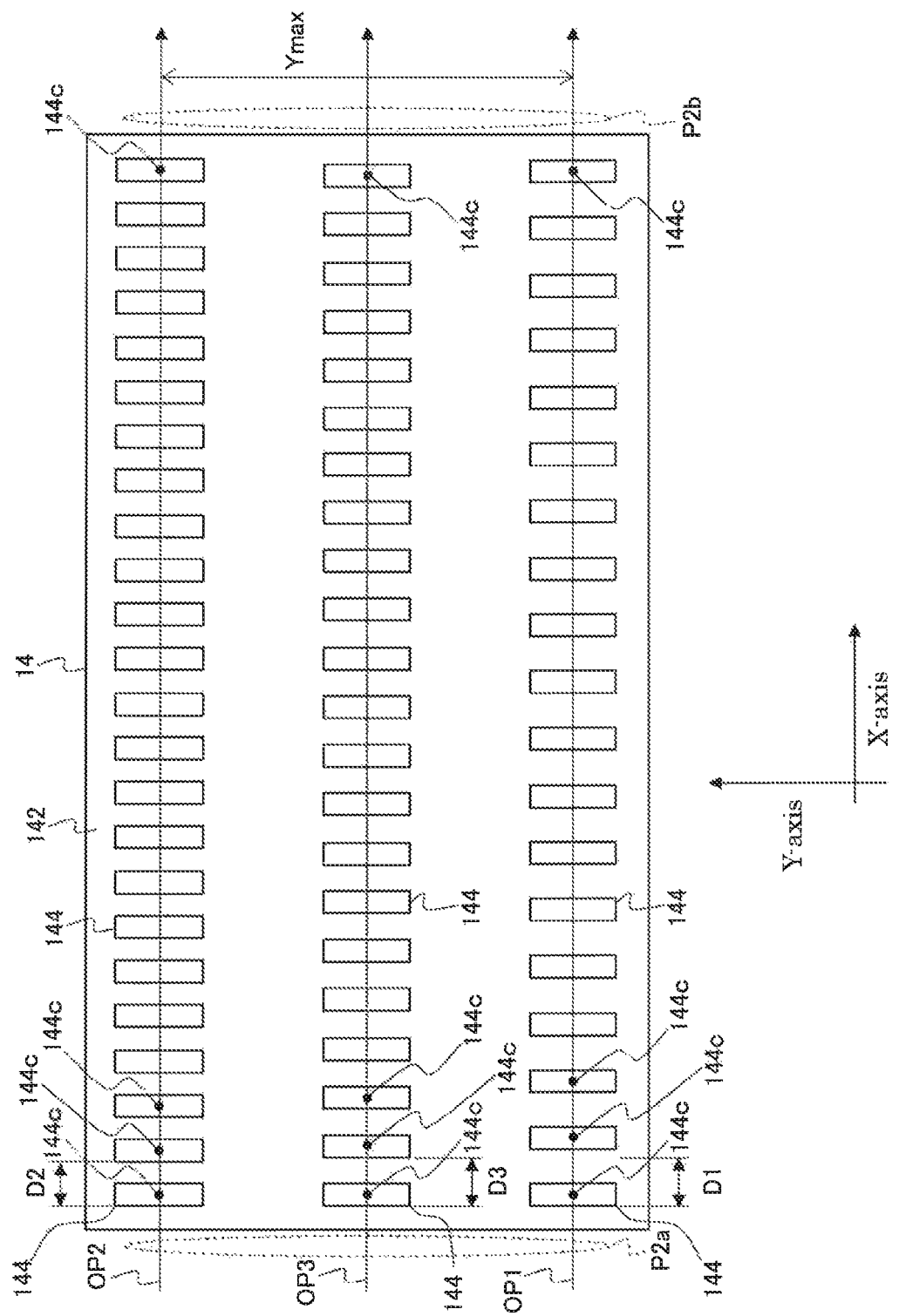
FIG. 13 is a plan view of a wavelength changing section 14 according to the third embodiment.

It is noted that Ymax defining the maximum distance between outputs from the convex lens (parallelizing section) 13 represents the distance between the optical paths OP1 and OP2 extending from the convex lens 13 to the achromatic lens 16 (see FIG. 13).

The wavelength changing section (PPLN) 14 is arranged to receive outputs from the convex lens (parallelizing section) 13, that is, light beams (i.e. second pulses P2a) traveling, respectively, through the multiple optical paths OP1, OP2, OP3 and then going through the convex lens 13 and to change the light beams to have their respective different wavelengths for output. The wavelength changing section 14 outputs second pulses (after wavelength conversion) P2b.

It is noted that one of the outputs from the acousto-optical modulator 12 (e.g. one traveling through the optical path OP1) may pass through the optical axis of the convex lens 13. In this case, the convex lens 13 is arranged not to change the traveling direction of light beams traveling through the optical path OP1, but to change the traveling direction of light beams traveling through the optical paths OP2 and OP3 to be in parallel to the optical path OP1.

With reference to FIG. 7, the wavelength changing section 14 is arranged to receive and convert ones (wavelength W1 [nm]) of the second pulses P2a traveling through the optical path OP1 into second pulses P2b (wavelength W2 [nm]). The wavelength changing section 14 is also arranged to receive and convert ones (wavelength W1 [nm]) of the second pulses P2a traveling through the optical path OP2 into second pulses P2b (wavelength W3 [nm]). The wavelength changing section 14 is further arranged to receive and convert ones (wavelength W1 [nm]) of the second pulses P2a traveling through the optical path OP3 into second pulses P2b (wavelength W4 [nm]).

FIG. 13 is a plan view of a wavelength changing section 14 according to the third embodiment. With reference to FIG. 13, the wavelength changing section 14 has an LN crystal substrate 142 and polarization reversed sections 144. It is noted that in FIG. 13, like FIG. 1, the X-axis direction of the LN crystal substrate 142 is shown in parallel to the landscape orientation of the drawing sheet.

The polarization reversed sections 144 are arranged such that outputs from the convex lens 13 (i.e. second pulses P2a) propagate therethrough. The polarization reversed sections 144 include ones through which the second pulses P2a traveling through the optical path OP1 propagate, ones through which the second pulses P2a traveling through the optical path OP2 propagate, and the others through which the second pulses P2a traveling through the optical path OP3 propagate. It is noted that the polarization reversed sections 144 are made of PPLN (periodically polarization-reversed lithium niobate) in FIG. 13, but not limited thereto and may be made of, for example, PPLT (lithium tantalate) or PPKTP.

The polarization reversed sections 144 through which the second pulses P2a traveling through the optical path OP1 propagate are arranged at predetermined spacing D1. The polarization reversed sections 144 through which the second pulses P2a traveling through the optical path OP2 propagate are arranged at predetermined spacing D2. The polarization reversed sections 144 through which the second pulses P2a traveling through the optical path OP3 propagate are arranged at predetermined spacing D3. The predetermined spacing varies depending on the outputs from the convex lens 13. That is, the predetermined spacing D1, the predetermined spacing D2, and the predetermined spacing D3 are different from each other.

The polarization reversed sections 144 are formed in the LN crystal substrate 142. All of the polarization reversed sections 144 are formed in the single LN crystal substrate 142. It is noted that in the third embodiment, the LN crystal substrate 142 may not be an LN crystal substrate as long as being a non-linear optical crystal substrate. This applies to other embodiments, in which a non-linear optical crystal substrate can be used instead of such an LN crystal substrate.

The graphical centers 144c of the polarization reversed sections 144 through which the second pulses P2a traveling through the optical path OP1 propagate are arranged on a straight line parallel to the X axis of the LN crystal substrate 142. The graphical centers 144c of the polarization reversed sections 144 through which the second pulses P2a traveling through the optical path OP2 propagate are also arranged on a straight line parallel to the X axis of the LN crystal substrate 142. The graphical centers 144c of the polarization reversed sections 144 through which the second pulses P2a traveling through the optical path OP3 propagate are also arranged on a straight line parallel to the X axis of the LN crystal substrate 142. It is noted that the graphical centers 144c of the polarization reversed sections 144 correspond to the centers of gravity with the assumption that the gravity acts uniformly on each polarization reversed section 144.

It is noted that in addition to the second pulses P2b, a laser beam (pump beam) output from the pumping laser 10 and having a wavelength W1 [nm] and an infrared idler beam originating from the wavelength changing section 14 are also mixed into the output from the wavelength changing section 14. It is noted that the wavelength changing section 14, when applied with a laser beam (pump beam), generates a signal beam and such an idler beam as described above due to optical parametric oscillation. The signal beam is thus output from the wavelength changing section 14 (as second pulses (after wavelength conversion) P2b) (the same applies to wavelength changing sections according to other embodiments).

The filter (F) 17 is arranged to remove the pump beam and the idler beam from the second pulses P2b for provision to the achromatic lens 16.

The achromatic lens (focusing section) (L2) 16 is identical to that in the first embodiment. Note, however, that the achromatic lens 16 is used to reduce the difference in the focal length (chromatic aberration) due to the difference in the wavelength among the second pulses P2b (wavelength W2 [nm]) (traveling through the optical path OP1), the second pulses P2b (wavelength W3 [nm]) (traveling through the optical path OP2), and the second pulses P2b (wavelength W4 [nm]) (traveling through the optical path OP3).

It is noted that when the difference among the wavelength W2 [nm], the wavelength W3 [nm], and the wavelength W4 [nm] is small, the focusing section may employ a single convex lens 16a instead of the achromatic lens 16.

Figure 14:
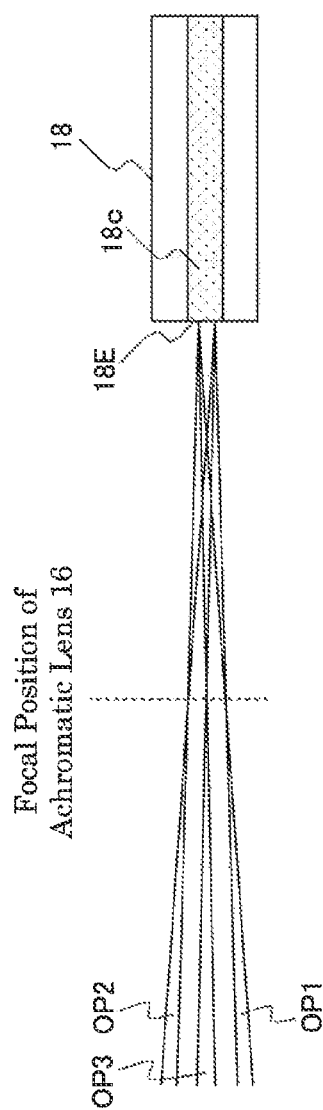
FIG. 14 is an enlarged cross-sectional view in the vicinity of an end face 18E of the core 18c of the optical fiber 18 in the third embodiment.

FIG. 14 is an enlarged cross-sectional view in the vicinity of an end face 18E of the core 18c of the optical fiber 18 in the third embodiment. The optical fiber 18 in the third embodiment is identical to that in the first embodiment. Note, however, that the optical fiber 18 is different from that in the first embodiment in that not only the second pulses P2b (wavelength W2 [nm]) (traveling through the optical path OP1) and the second pulses P2b (wavelength W3 [nm]) (traveling through the optical path OP2), but also the second pulses P2b (wavelength W4 [nm]) (traveling through the optical path OP3) are focused on the end face 18E of the core 18c.

The optical fiber (MMF) 18 is arranged to cause the outputs from the wavelength changing section 14 focused on the end face 18E of the core 18c to be output through the other end (third pulses P3) (see FIG. 7).

Next will be described an operation according to the third embodiment.

The pumping laser 10 first outputs a laser beam having a predetermined wavelength W1 [nm] as first pulses P1 having a predetermined frequency (e.g. 2 kHz) (see FIG. 7). The first pulses P1 are attenuated through the optical attenuator 11 and provided to the acousto-optical deflector 120. The timing control circuit 19 controls the timing of the output from the acousto-optical deflector 120 (see FIG. 7).

At the time the acousto-optical deflector 120 receives (1+3N)-numbered (1st, 4th, 7th . . . ) ones of the first pulses P1, no acoustic wave is provided to the acousto-optical deflector 120. The (1+3N)-numbered ones of the first pulses P1 then directly go straight through the acousto-optical deflector 120 (optical path OP1). This causes light beams traveling through the optical path OP1 to go straight through the convex lens 13 in its optical axis direction to be second pulses (before wavelength conversion) P2a having a frequency (⅔ kHz) obtained by dividing the predetermined frequency (e.g. 2 kHz) by the number (three) of the multiple optical paths.

At the time the acousto-optical deflector 120 receives (2+3N)-numbered (2nd, 5th, 8th . . . ) ones of the first pulses P1, an acoustic wave (with an angular frequency ω2) is provided to the acousto-optical deflector 120. The (2+3N)-numbered ones of the first pulses P1 then go through the acousto-optical deflector 120 with some degree of diffraction (optical path OP2). This causes light beams traveling through the optical path OP2 to go through the convex lens 13 while traveling into parallel to the optical path OP1 to be second pulses (before wavelength conversion) P2a having a frequency (⅔ kHz) obtained by dividing the predetermined frequency (e.g. 2 kHz) by the number (three) of the multiple optical paths.

At the time the acousto-optical deflector 120 receives (3+3N)-numbered (3rd, 6th, 9th . . . ) ones of the first pulses P1, an acoustic wave (with an angular frequency ω3) is provided to the acousto-optical deflector 120. The (3+3N)-numbered ones of the first pulses P1 then go through the acousto-optical deflector 120 with some degree of diffraction (optical path OP3). This causes light beams traveling through the optical path OP3 to go through the convex lens 13 while traveling into parallel to the optical path OP1 to be second pulses (before wavelength conversion) P2a having a frequency (⅔ kHz) obtained by dividing the predetermined frequency (e.g. 2 kHz) by the number (three) of the multiple optical paths.

In addition, the phase of the light beams traveling through the optical path OP1 and going through the convex lens 13 (second pulses (before wavelength conversion) P2a) is 120-degree different from the phase of the light beams traveling through the optical path OP2 and going through the convex lens 13 (second pulses (before wavelength conversion) P2a). The phase of the light beams traveling through the optical path OP2 and going through the convex lens 13 (second pulses (before wavelength conversion) P2a) is 120-degree different from the phase of the light beams traveling through the optical path OP3 and going through the convex lens 13 (second pulses (before wavelength conversion) P2a). The phase of the light beams traveling through the optical path OP1 and going through the convex lens 13 (second pulses (before wavelength conversion) P2a) is 240-degree different from the phase of the light beams traveling through the optical path OP3 and going through the convex lens 13 (second pulses (before wavelength conversion) P2a).

The light beams traveling through the optical path OP1 and going through the convex lens 13 (second pulses (before wavelength conversion) P2a, with a wavelength W1 [nm]) propagate through the polarization reserved sections 144, which are arranged at the predetermined spacing D1 in the wavelength changing section 14, to undergo wavelength conversion into w2 [nm], and travel through the filter 17 for removal of the pump beam and the idler beam and then provided to the achromatic lens 16 as second pulses (after wavelength conversion) P2b.

The light beams traveling through the optical path OP2 and going through the convex lens 13 (second pulses (before wavelength conversion) P2a, with a wavelength W1 [nm]) propagate through the polarization reserved sections 144, which are arranged at the predetermined spacing D2 in the wavelength changing section 14, to undergo wavelength conversion into w3 [nm], and travel through the filter 17 for removal of the pump beam and the idler beam and then provided to the achromatic lens 16 as second pulses (after wavelength conversion) P2b.

The light beams traveling through the optical path OP3 and going through the convex lens 13 (second pulses (before wavelength conversion) P2a, with a wavelength W1 [nm]) propagate through the polarization reserved sections 144, which are arranged at the predetermined spacing D3 in the wavelength changing section 14, to undergo wavelength conversion into w4 [nm], and travel through the filter 17 for removal of the pump beam and the idler beam and then provided to the achromatic lens 16 as second pulses (after wavelength conversion) P2b.

Ones of the second pulses (after wavelength conversion) P2b output from the wavelength changing section 14 and having the wavelength W2 [nm], the wavelength W3 [nm], and the wavelength W4 [nm] are focused through the achromatic lens 16 onto the end face 18E of the core 18c of the optical fiber 18 to be third pulses P3 having a predetermined frequency (2 kHz).

The third pulses P3 are output through the other end of the optical fiber 18.

In accordance with the third embodiment, the acousto-optical deflector 120 is used instead of the acousto-optical modulator 12, whereby the number of multiple optical paths can be increased to three (optical paths OP1, OP2, OP3). The third pulses P3 thus provides for irradiation with pulsed light of the wavelength W2 [nm] and immediately thereafter (e.g. after 500 microseconds) pulsed light of the different wavelength W3 [nm]. It further provides for irradiation with pulsed light of the wavelength W3 [nm] and immediately thereafter (e.g. after 500 microseconds) pulsed light of the further different wavelength W4 [nm]. That is, the third embodiment allows for irradiation with pulsed light of one wavelength, immediately thereafter pulsed light of another wavelength, and immediately thereafter pulsed light of a further wavelength. The third embodiment thus allows for irradiation with pulsed light of three wavelengths.

In addition, in accordance with the third embodiment, no multiplexer (e.g. dichroic mirror) is required to multiplex ones of the second pulses (after wavelength conversion) P2b output from the wavelength changing section 14 and having the wavelength W2 [nm], the wavelength W3 [nm], and the wavelength W4 [nm]. While it is difficult, with a dichroic mirror, to adjust the optical axis and accommodate the change in the wavelength W2 [nm], the wavelength W3 [nm], and the wavelength W4 [nm] of the second pulses (after wavelength conversion) P2b, such an effort can be reduced if no dichroic mirror is required.

It is noted that the number of multiple optical paths may be four or more, though three in the above-described third embodiment. This allows for irradiation with pulsed light of four or more wavelengths.

Also, in the third embodiment, like the first embodiment, all of the polarization reversed sections 144 are formed in the single LN crystal substrate 142. However, LN crystal substrates may be provided, respectively, for the outputs from the convex lens 13 (traveling through the optical path OP1, the optical path OP2, and the optical path OP3) that propagate therethrough, as is the case in the second embodiment.

Variations

It is noted that in the third embodiment, the outputs from the convex lens 13 pass through the respective different polarization reversed sections 144 (arranged at the predetermined spacing D1, D2, and D3, respectively) (see FIG. 13). All of the outputs from the convex lens 13 may, however, pass through shared polarization reversed sections 144.

Figure 16:
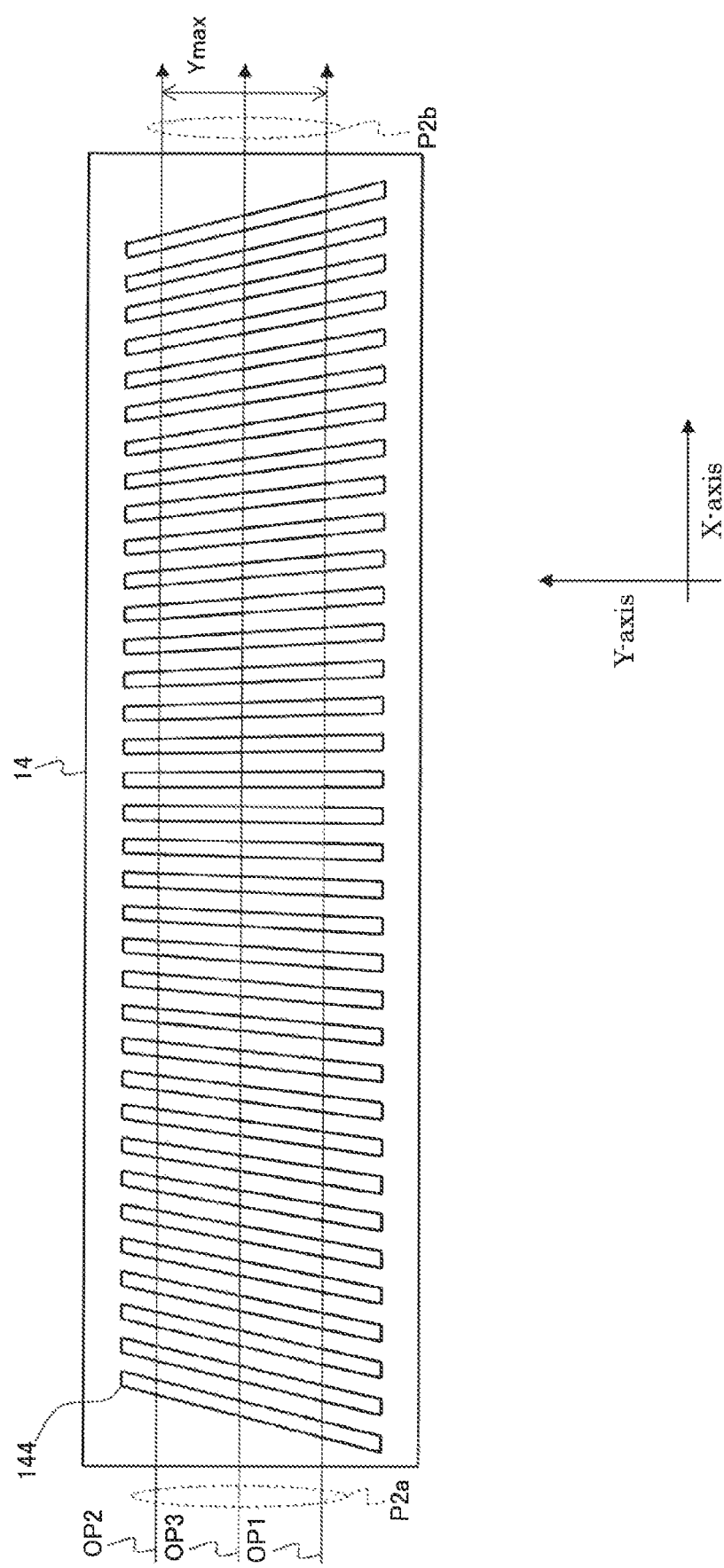
FIG. 16 is a plan view of a wavelength changing section 14 according to a variation of the third embodiment.

FIG. 16 is a plan view of a wavelength changing section 14 according to a variation of the third embodiment. With reference to FIG. 16, the wavelength changing section 14 according to the variation of the third embodiment has an LN crystal substrate 142 and polarization reversed sections 144. It is noted that in FIG. 16, like FIG. 1, the X-axis direction of the LN crystal substrate 142 is shown in parallel to the landscape orientation of the drawing sheet.

The polarization reversed sections 144 shown in FIG. 16 are of Fan-Out type. That is, the polarization reversed sections 144 shown in FIG. 16 have spacing therebetween in the X-axis direction that increases with a decrease in the Y-coordinate. The optical path OP1 has the smallest Y-coordinate, the optical path OP3 has the second smallest Y-coordinate, and the optical path OP2 has the largest Y-coordinate. Accordingly, the spacing between the polarization reversed sections 144 in the X-axis direction is largest on the optical path OP1 (spacing D1), second largest on the optical path OP3 (spacing D3), and smallest on the optical path OP2 (spacing D2). It is noted that the second pulses P2a traveling through the optical path OP1, the second pulses P2a traveling through the optical path OP2, and the second pulses P2a traveling through the optical path OP3 all pass through the shared polarization reversed sections 144.

Fourth Embodiment

A laser beam output apparatus 1 according to a fourth embodiment is arranged for irradiation with "multiple" pulses of light of one wavelength W2 [nm] (within a predetermined temporal range TR1) and immediately thereafter "multiple" pulses of light of another wavelength W3 [nm] (within a predetermined temporal range TR2) (see P3 in FIG. 9), which differs from the first embodiment in which irradiation is provided with "one" pulse of light of one wavelength W2 [nm] and immediately thereafter "one" pulse of light of another wavelength W3 [nm] (see P3 in FIG. 3).

The laser beam output apparatus 1 according to the fourth embodiment is also arranged such that the first pulses P1 have a non-constant frequency, which differs from the first embodiment in which the first pulses P1 have a constant frequency (e.g. 2 kHz).

Figure 8:
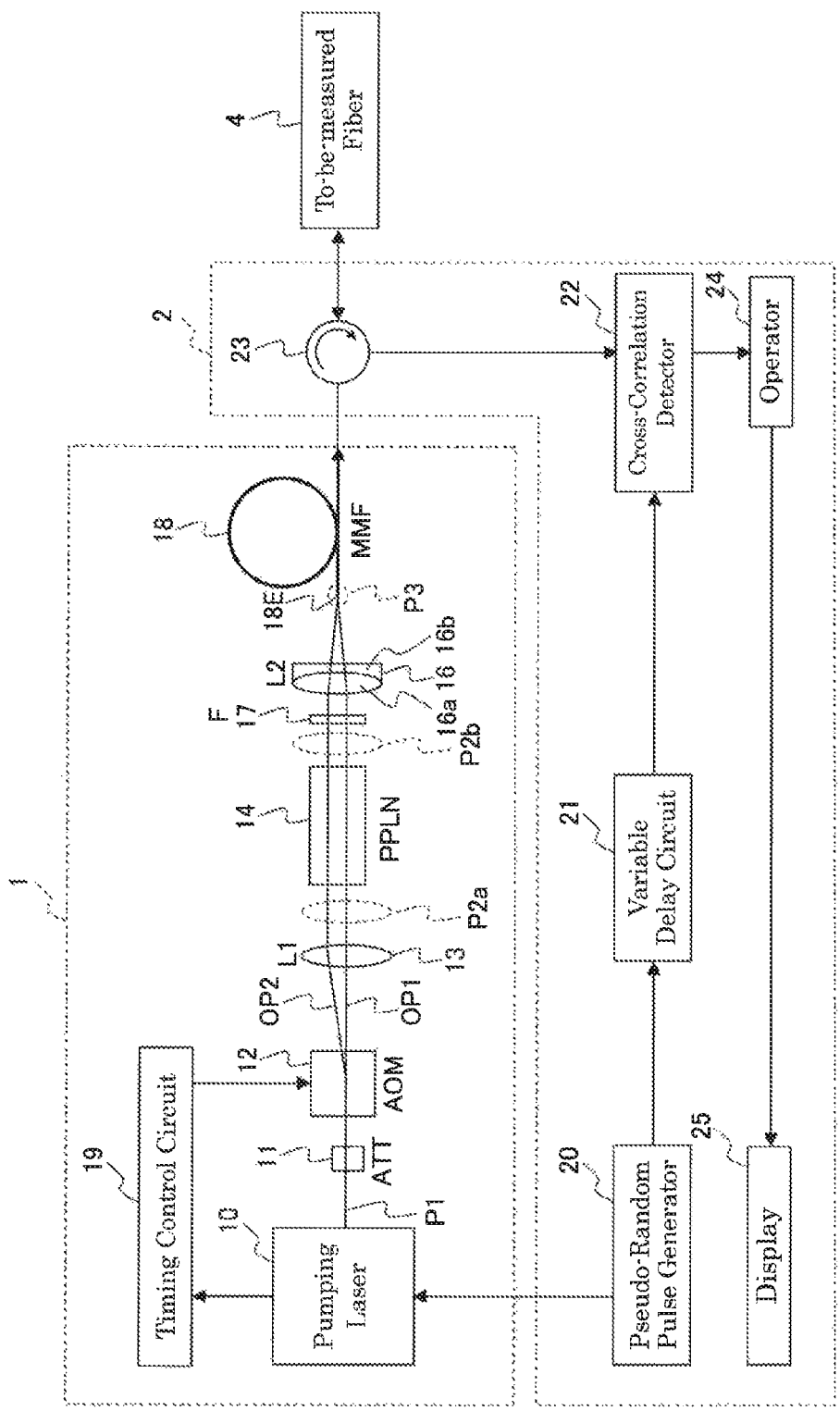
FIG. 8 shows a configuration of the laser beam output apparatus 1 according to the fourth embodiment.
Figure 9:
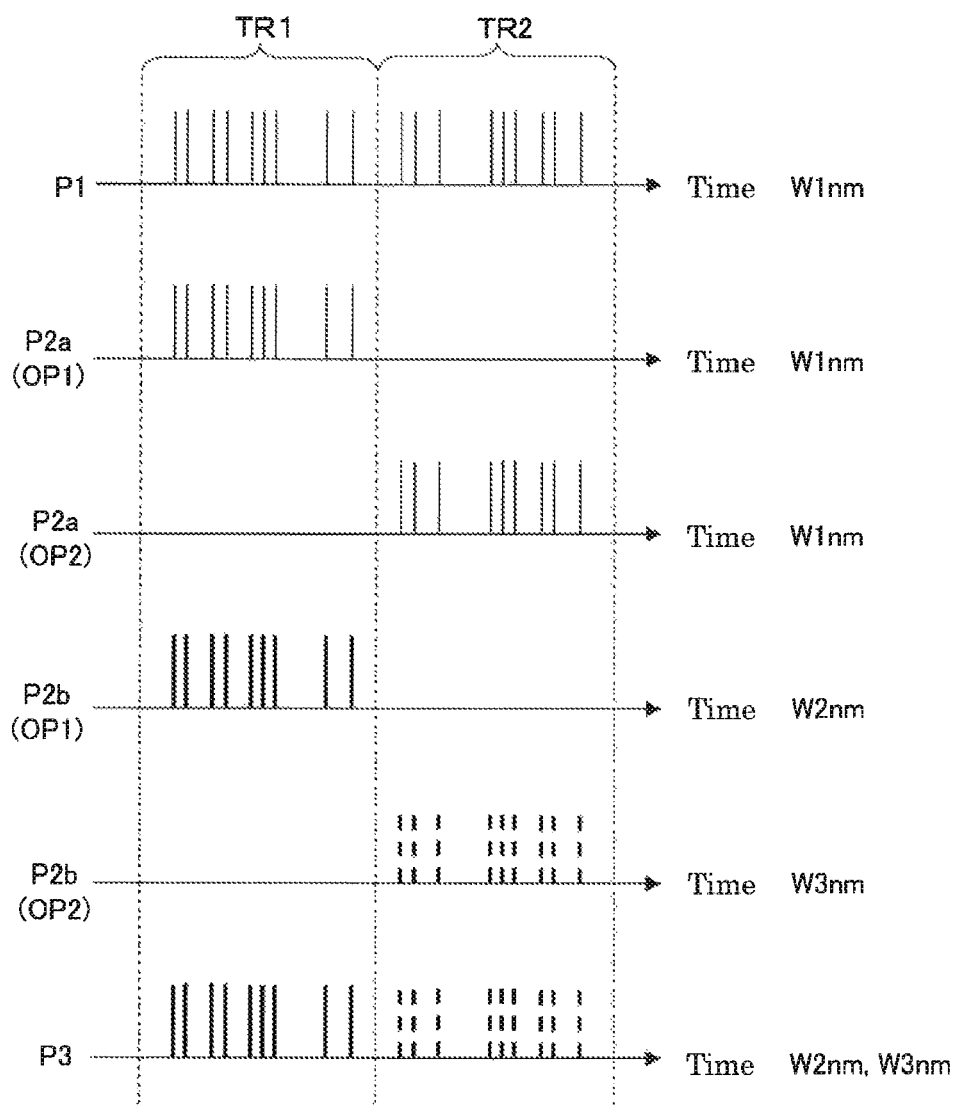
FIG. 9 shows timing charts of first pulses P1, second pulses (before wavelength conversion) P2a, second pulses (after wavelength conversion) P2b, and third pulses P3 according to the fourth embodiment.

FIG. 8 shows a configuration of the laser beam output apparatus 1 according to the fourth embodiment. FIG. 9 shows timing charts of first pulses P1, second pulses (before wavelength conversion) P2a, second pulses (after wavelength conversion) P2b, and third pulses P3 according to the fourth embodiment. It is noted that in FIG. 9, the thickness and type (solid or broken) of lines indicating the pulses vary depending on the wavelength.

The laser beam output apparatus 1 according to the fourth embodiment includes a pumping laser (pulsed laser output section) 10, an optical attenuator (ATT) 11, an acousto-optical modulator (optical path determining section) (AOM) 12, a convex lens (parallelizing section) (L1) 13, a wavelength changing section (PPLN) 14, an achromatic lens (focusing section) (L2) 16, a filter (F) 17, an optical fiber (MMF) 18, and a timing control circuit (timing control section) 19.

The laser beam output apparatus 1 according to the fourth embodiment is intended to measure a to-be-measured fiber 4, an optical fiber to be measured, through OTDR. The laser beam output apparatus 1 is connected to the to-be-measured fiber 4 through measuring equipment 2.

The pumping laser (pulsed laser output section) 10 is arranged to output a laser beam having a predetermined wavelength W1 [nm] as first pulses P1 (see FIG. 9). The pumping laser 10 is, for example, a Yb:YAG laser. With reference to FIG. 9, the first pulses P1 are from a pseudo-random signal (e.g. M-sequence signal) output for each of the predetermined temporal ranges TR1, TR2. It is noted that the length of the predetermined temporal ranges TR1, TR2 corresponds to one cycle of the M-sequence signal. It is further noted that unlike the first to third embodiments, the first pulses P1 are from a pseudo-random signal and thereby have a non-constant frequency.

The optical attenuator (ATT) 11, the convex lens (parallelizing section) (L1) 13, the achromatic lens (focusing section) (L2) 16, the filter (F) 17, the optical fiber (MMF) 18, and the timing control circuit (timing control section) 19 are identical to those in the first embodiment, and the description thereof will be omitted.

The configuration of the wavelength changing section 14 is identical to that in the first embodiment (see FIG. 2), and the description thereof will be omitted.

The acousto-optical modulator (optical path determining section) (AOM) 12 is arranged to receive the first pulses P1 and determine one among multiple optical paths OP1, OP2 for each of the first pulses P1 for output.

For example, with reference to FIGS. 8 and 9, at the time the acousto-optical modulator 12 receives multiple ones of the first pulses P1 within the predetermined temporal range TR1, no acoustic wave is provided to the acousto-optical modulator 12. The multiple ones of the first pulses P1 within the predetermined temporal range TR1 then directly go straight through the acousto-optical modulator 12 (optical path OP1).

On the other hand, at the time the acousto-optical modulator 12 receives multiple ones of the first pulses P1 within the predetermined temporal range TR2, an acoustic wave (with an angular frequency $\omega 2$) is provided to the acousto-optical modulator 12. The multiple ones of the first pulses P1 within the predetermined temporal range TR2 then go through the acousto-optical modulator 12 with some degree of diffraction (optical path OP2).

Note, however, that at the time the acousto-optical modulator 12 receives multiple ones of the first pulses P1 within the predetermined temporal range TR1, an acoustic wave (with an angular frequency ω1, which is different from ω2) may be provided to the acousto-optical modulator 12.

This causes the acousto-optical modulator 12 to output, respectively on the multiple optical paths OP1, OP2, second pulses (before wavelength conversion) P2a among the first pulses P1 within the predetermined temporal ranges TR1, TR2, the predetermined temporal ranges differing from (not overlapping) each other.

That is, the acousto-optical modulator 12 outputs, on the optical path OP1, multiple ones of the first pulses P1 within the predetermined temporal range TR1 (see P2a (OP1) in FIG. 9). The acousto-optical modulator 12 further outputs, on the optical path OP2, multiple ones of the first pulses P1 within the predetermined temporal range TR2 (see P2a (OP2) in FIG. 9). The second pulses P2a traveling through the optical path OP1 (P2a (OP1)) and the second pulses P2a traveling through the optical path OP2 (P2a (OP2)) have their respective different predetermined temporal ranges (not overlapping each other).

The wavelength changing section (PPLN) 14 is arranged to receive outputs from the convex lens (parallelizing section) 13, that is, light beams (i.e. second pulses P2a) traveling, respectively, through the multiple optical paths OP1, OP2 and then going through the convex lens 13 and to change the light beams to have their respective different wavelengths for output. The wavelength changing section 14 outputs second pulses (after wavelength conversion) P2b.

With reference to FIG. 9, the wavelength changing section 14 is arranged to receive and convert ones (wavelength W1 [nm]) of the second pulses P2a traveling through the optical path OP1 into second pulses P2b (wavelength W2 [nm]). The wavelength changing section 14 is also arranged to receive and convert ones (wavelength W1 [nm]) of the second pulses P2a traveling through the optical path OP2 into second pulses P2b (wavelength W3 [nm]).

The measuring equipment 2 has a pseudo-random pulse generator 20, a variable delay circuit 21, a cross-correlation detector 22, a circulator 23, an operator 24, and a display 25. The measuring equipment 2 is intended to measure the to-be-measured fiber 4 through OTDR.

The pseudo-random pulse generator 20 is arranged to generate a pseudo-random pulse RP. The timing of the output of the pseudo-random pulse RP is the same as the timing of the output of the first pulses P1. The pumping laser 10 is arranged to output the first pulses P1 in synchronization with the timing of the output of the pseudo-random pulse RP. The pseudo-random pulse generator 20 is arranged to provide the pseudo-random pulse RP to the pumping laser 10 and the variable delay circuit 21.

The variable delay circuit 21 is arranged to receive and delay the pseudo-random pulse RP (the delay time is variable) and provide it to the cross-correlation detector 22.

The cross-correlation detector 22 is arranged to receive the pseudo-random pulse RP from the variable delay circuit 21 and also reflected light and scattered light from the to-be-measured fiber 4 via the circulator 23 to detect cross-correlation.

The circulator 23 is connected to the other end of the optical fiber (MMF) 18, the input end of the to-be-measured fiber 4, and the cross-correlation detector 22. The circulator 23 is arranged to provide third pulses P3 output from the other end of the optical fiber (MMF) 18 to the input end of the to-be-measured fiber 4. The circulator 23 is arranged to receive reflected light and scattered light from the to-be-measured fiber 4 via the input end of the to-be-measured fiber 4 and provide them to the cross-correlation detector 22.

The operator 24 is arranged to compute the distance between a portion (e.g. disconnection site) of the to-be-measured fiber 4 at which the reflected light and the scattered light are generated and the input end of the to-be-measured fiber 4 based on the cross-correlation detected by the cross-correlation detector 22.

The display 25 is arranged to display the result of computation by the operator 24.

Next will be described an operation according to the fourth embodiment.

The pseudo-random pulse generator 20 first provides a pseudo-random pulse RP to the pumping laser 10. The pumping laser 10 outputs a laser beam having a predetermined wavelength W1 [nm] as first pulses P1 (see FIG. 9) in synchronization with the timing of the output of the pseudo-random pulse RP. The first pulses P1 are attenuated through the optical attenuator 11 and provided to the acousto-optical modulator 12. The timing control circuit 19 controls the timing of the output from the acousto-optical modulator 12 (see FIG. 9).

At the time the acousto-optical modulator 12 receives multiple ones of the first pulses P1 within the predetermined temporal range TR1, no acoustic wave is provided to the acousto-optical modulator 12. The multiple ones of the first pulses P1 within the predetermined temporal range TR1 then directly go straight through the acousto-optical modulator 12 (optical path OP1).

At the time the acousto-optical modulator 12 receives multiple ones of the first pulses P1 within the predetermined temporal range TR2, an acoustic wave (with an angular frequency ω2) is provided to the acousto-optical modulator 12. The multiple ones of the first pulses P1 within the predetermined temporal range TR2 then go through the acousto-optical modulator 12 with some degree of diffraction (optical path OP2).

In addition, the light beams traveling through the optical path OP1 (second pulses (before wavelength conversion) P2a) is the first pulses P1 within the predetermined temporal range TR1, while the light beams traveling through the optical path OP2 (second pulses (before wavelength conversion) P2a) is the first pulses P1 within the predetermined temporal range TR2 (the predetermined temporal ranges differ from each other).

The light beams traveling through the optical path OP1 and going through the convex lens 13 (second pulses (before wavelength conversion) P2a, with a wavelength W1 [nm]) propagate through the polarization reserved sections 144, which are arranged at the predetermined spacing D1 in the wavelength changing section 14, to undergo wavelength conversion into w2 [nm], and travel through the filter 17 for removal of the pump beam and the idler beam and then provided to the achromatic lens 16 as second pulses (after wavelength conversion) P2b.

The light beams traveling through the optical path OP2 and going through the convex lens 13 (second pulses (before wavelength conversion) P2a, with a wavelength W1 [nm]) propagate through the polarization reserved sections 144, which are arranged at the predetermined spacing D2 in the wavelength changing section 14, to undergo wavelength conversion into w3 [nm], and travel through the filter 17 for removal of the pump beam and the idler beam and then provided to the achromatic lens 16 as second pulses (after wavelength conversion) P2b.

Ones of the second pulses (after wavelength conversion) P2b output from the wavelength changing section 14 and having the wavelength W2 [nm] and the wavelength W3 [nm] are focused through the achromatic lens 16 onto the end face 18E of the core 18c of the optical fiber 18 to be third pulses P3 having a predetermined frequency (2 kHz).

The third pulses P3 are output through the other end of the optical fiber 18.

The third pulses P3 output from the other end of the optical fiber 18 is provided to the input end of the to-be-measured fiber 4 via the circulator 23. Scattered light and reflected light from the to-be-measured fiber 4 are provided to the cross-correlation detector 22 via the circulator 23 to undergo cross-correlation with the pseudo-random pulse RP. Based on the cross-correlation, the distance between a portion (e.g. disconnection site) of the to-be-measured fiber 4 at which the reflected light and the scattered light are generated and the input end of the to-be-measured fiber 4 is computed by the operator 24 and displayed on the display 25.

In accordance with the fourth embodiment, the third pulses P3 can be output from the optical fiber 18. The third pulses P3 provides for irradiation with multiple pulses of light of the wavelength W2 [nm] and immediately thereafter multiple pulses of light of the different wavelength W3 [nm]. That is, the fourth embodiment allows for irradiation with pulsed light of one wavelength and immediately thereafter pulsed light of another wavelength. It is noted that no multiplexer (e.g. dichroic mirror) is required as is the case in the first embodiment.

Fifth Embodiment

In the fifth embodiment, a to-be-measured object (e.g. aerosol) is measured through LIDAR, which differs from the fourth embodiment in which the to-be-measured fiber 4 is measured through OTDR.

Figure 10:
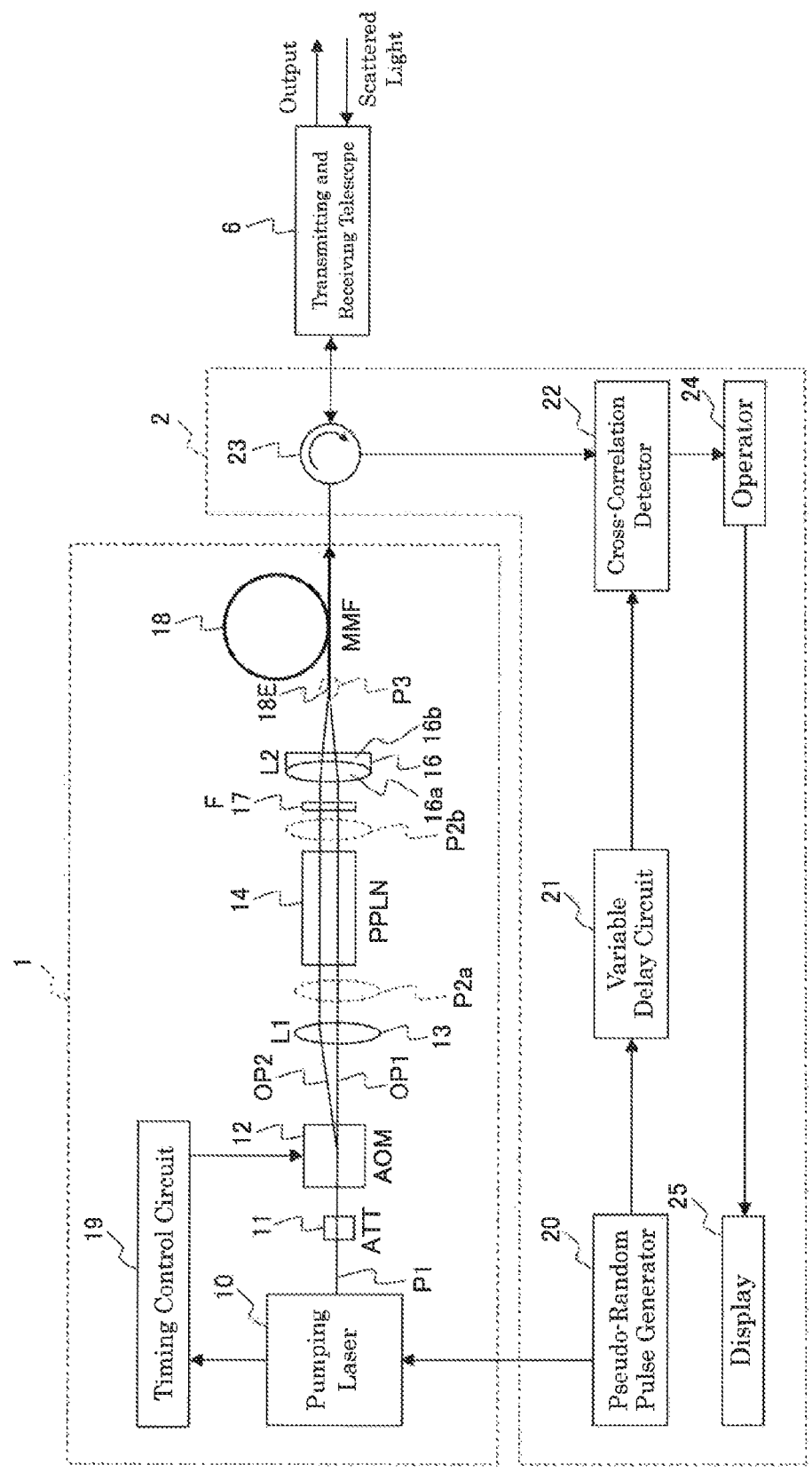
FIG. 10 shows a configuration of the laser beam output apparatus 1 according to the fifth embodiment.

FIG. 10 shows a configuration of the laser beam output apparatus 1 according to the fifth embodiment. It is noted that the timing charts of first pulses P1, second pulses (before wavelength conversion) P2a, second pulses (after wavelength conversion) P2b, and third pulses P3 according to the fifth embodiment are identical to those in the fourth embodiment, and the description thereof will be omitted (see FIG. 9).

The laser beam output apparatus 1 according to the fifth embodiment is intended to measure a to-be-measured object (e.g. aerosol) through LIDAR. The laser beam output apparatus 1 is connected to a transmitting and receiving telescope 6 through measuring equipment 2.

The laser beam output apparatus 1 according to the fifth embodiment includes a pumping laser (pulsed laser output section) 10, an optical attenuator (ATT) 11, an acousto-optical modulator (optical path determining section) (AOM) 12, a convex lens (parallelizing section) (L1) 13, a wavelength changing section (PPLN) 14, an achromatic lens (focusing section) (L2) 16, a filter (F) 17, an optical fiber (MMF) 18, and a timing control circuit (timing control section) 19. Since these are identical to those in the fourth embodiment, the description thereof will be omitted.

The measuring equipment 2 has a pseudo-random pulse generator 20, a variable delay circuit 21, a cross-correlation detector 22, a circulator 23, an operator 24, and a display 25. Since the pseudo-random pulse generator 20, the variable delay circuit 21, the cross-correlation detector 22, the operator 24, and the display 25 are identical to those in the fourth embodiment, the description thereof will be omitted.

The circulator 23 is connected to the other end of the optical fiber (MMF) 18, the transmitting and receiving telescope 6, and the cross-correlation detector 22. The circulator 23 is arranged to provide third pulses P3 output from the other end of the optical fiber (MMF) 18 to the transmitting and receiving telescope 6. The circulator 23 is arranged to receive scattered light from the to-be-measured object via the transmitting and receiving telescope 6 and provide it to the cross-correlation detector 22.

The transmitting and receiving telescope 6 is arranged to receive third pulses P3 output from the other end of the optical fiber 18 via the circulator 23 and provide them to the to-be-measured object. The transmitting and receiving telescope 6 is further arranged to receive scattered light from the to-be-measured object and provide it to the cross-correlation detector 22 via the circulator 23.

Next will be described an operation according to the fifth embodiment.

Since the operations until the output of third pulses P3 from the other end of the optical fiber 18 are identical to those in the fourth embodiment, the description thereof will be omitted.

The third pulses P3 output from the other end of the optical fiber 18 is provided to the transmitting and receiving telescope 6 via the circulator 23. When the third pulses P3 are provided from the transmitting and receiving telescope 6 to the to-be-measured object (e.g. aerosol), scattered light from the to-be-measured object is provided to the transmitting and receiving telescope 6. The scattered light is provided to the cross-correlation detector 22 via the circulator 23 to undergo cross-correlation with the pseudo-random pulse RP. Based on the cross-correlation, the distance between the transmitting and receiving telescope 6 and a site at which the scattered light is generated is computed by the operator 24 and displayed on the display 25. It is noted that based on the distance computed by the operator 24, the type of aerosol can also be identified by a differential absorption method.

The fifth embodiment exhibits the same advantageous effects as the fourth embodiment.

Sixth Embodiment

The laser beam output apparatus 1 according to the sixth embodiment differs from the laser beam output apparatus 1 according to the third embodiment mainly in that an optical path determining section (a first acousto-optical modulator (AOM) 12a and a second acousto-optical modulator (AOM) 12b) is used instead of the acousto-optical deflector (AOD) (optical path determining section) 120.

Figure 11:
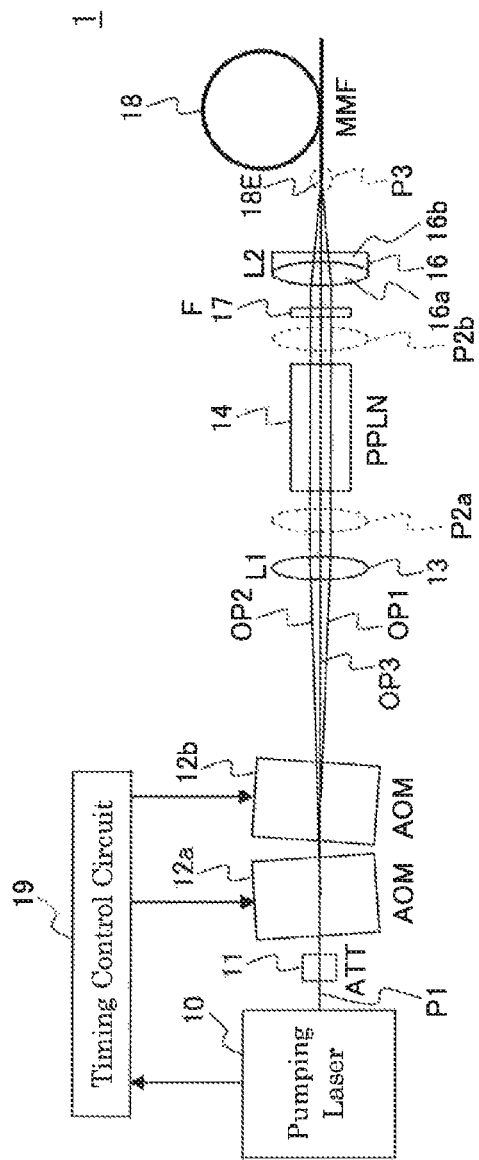
FIG. 11 shows a configuration of the laser beam output apparatus 1 according to the sixth embodiment.
Figure 12:
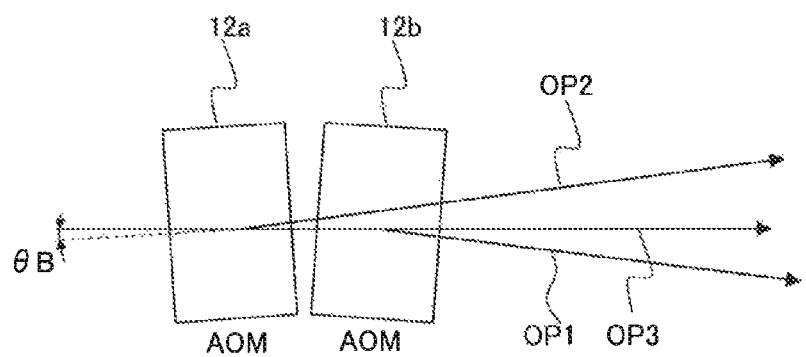
FIG. 12 is an enlarged view around the optical path determining section (the first acousto-optical modulator (AOM) 12a and the second acousto-optical modulator (AOM) 12b) in the laser beam output apparatus 1 according to the sixth embodiment.

FIG. 11 shows a configuration of the laser beam output apparatus 1 according to the sixth embodiment. FIG. 12 is an enlarged view around the optical path determining section (the first acousto-optical modulator (AOM) 12a and the second acousto-optical modulator (AOM) 12b) in the laser beam output apparatus 1 according to the sixth embodiment.

The laser beam output apparatus 1 according to the sixth embodiment includes a pumping laser (pulsed laser output section) 10, an optical attenuator (ATT) 11, a first acousto-optical modulator (AOM) 12a, a second acousto-optical modulator (AOM) 12b, a convex lens (parallelizing section) (L1) 13, a wavelength changing section (PPLN) 14, an achromatic lens (focusing section) (L2) 16, a filter (F) 17, an optical fiber (MMF) 18, and a timing control circuit (timing control section) 19. Components identical to those in the third embodiment will hereinafter be designated by the same reference signs to omit the description thereof.

The pumping laser (pulsed laser output section) 10, the optical attenuator (ATT) 11, the convex lens (parallelizing section) (L1) 13, the wavelength changing section (PPLN) 14, the achromatic lens (focusing section) (L2) 16, the filter (F) 17, the optical fiber (MMF) 18, and the timing control circuit (timing control section) 19 are identical to those in the third embodiment, and the description thereof will be omitted. Note, however, that the timing control circuit 19 is arranged to control the timing of the output from the optical path determining section (the first acousto-optical modulator (AOM) 12a and the second acousto-optical modulator (AOM) 12b) (see P2a in FIG. 7).

While the wavelength changing section 14 employs a single LN crystal substrate 142 will all polarization reversed sections 144 formed thereon, LN crystal substrates may be provided, respectively, for the outputs from the convex lens 13 (traveling through the optical path OP1, the optical path OP2, and the optical path OP3) that propagate therethrough, as is the case in the second embodiment.

Also, the outputs from the convex lens 13 pass through the respective different polarization reversed sections 144 (arranged at the predetermined spacing D1, D2, and D3, respectively) (see FIG. 13). All of the outputs from the convex lens 13 may, however, pass through shared polarization reversed sections 144 (see FIG. 16).

The optical path determining section has the first acousto-optical modulator (AOM) 12a and the second acousto-optical modulator (AOM) 12b. Both the first acousto-optical modulator (AOM) 12a and the second acousto-optical modulator (AOM) 12b have a rectangular planar shape.

One of the longer sides of the first acousto-optical modulator (AOM) 12a receives the first pulses P1. The shorter sides of the first acousto-optical modulator (AOM) 12a are inclined θB (Bragg's angle) counterclockwise with respect to the optical path OP3.

One of the longer sides of the second acousto-optical modulator (AOM) 12b receives the output from the first acousto-optical modulator (AOM) 12a. The shorter sides of the second acousto-optical modulator (AOM) 12b are inclined θB (Bragg's angle) clockwise with respect to the optical path OP3.

The first acousto-optical modulator (AOM) 12a is arranged to receive the first pulses P1 and determine one among multiple optical paths OP2, OP3 for each of the first pulses P1 for output. In the sixth embodiment, the first acousto-optical modulator (AOM) 12a is arranged to diffract (optical path OP2) or directly advance (optical path OP3) each of the first pulses P1 for output.

The second acousto-optical modulator (AOM) 12b is arranged to receive the output from the first acousto-optical modulator 12a and determine one among one or more optical paths OP1, OP2, OP3 for each of the pulses of the output from the first acousto-optical modulator 12a for output. In the sixth embodiment, the second acousto-optical modulator (AOM) 12b is arranged to receive and diffract (optical path OP1) or directly advance (optical path OP3) the directly advanced ones (optical path OP3) of the first pulses for output, while receive and directly advance (optical path OP2) the diffracted ones (optical path OP2) of the first pulses for output.

It is noted that the timing charts of first pulses P1, second pulses (before wavelength conversion) P2a, second pulses (after wavelength conversion) P2b, and third pulses P3 (input to the optical fiber (MMF) 18) according to the sixth embodiment are identical to those in FIG. 7.

For example, with reference to FIGS. 12 and 7, at the time the optical path determining section receives (1+3N)-numbered (1st, 4th, 7th . . . ) ones (where N represents an integer equal to or greater than 0) of the first pulses P1, no acoustic wave is provided to the first acousto-optical modulator (AOM) 12a, while an acoustic wave is provided to the second acousto-optical modulator (AOM) 12b. The (1+3N)-numbered ones of the first pulses P1 then travel through the optical path OP1 (see FIG. 12).

At the time the optical path determining section receives (2+3N)-numbered (2nd, 5th, 8th . . . ) ones of the first pulses P1, an acoustic wave is provided to the first acousto-optical modulator (AOM) 12a, while no acoustic wave is also provided to the second acousto-optical modulator (AOM) 12b. The (2+3N)-numbered ones of the first pulses P1 then travel through the optical path OP2 (see FIG. 12).

At the time the optical path determining section receives (3+3N)-numbered (3rd, 6th, 9th . . . ) ones of the first pulses P1, no acoustic wave is provided to the first acousto-optical modulator (AOM) 12a and no acoustic wave is also provided to the second acousto-optical modulator (AOM) 12b. The (3+3N)-numbered ones of the first pulses P1 then travel through the optical path OP3 (see FIG. 12).

This causes the optical path determining section to output, respectively, on the multiple optical paths OP1, OP2, OP3, pulses having a frequency (⅔ kHz) obtained by dividing the predetermined frequency (e.g. 2 kHz) by the number (three) of the multiple optical paths and having their respective 120-degree different phases.

Next will be described an operation according to the sixth embodiment.

The pumping laser 10 first outputs a laser beam having a predetermined wavelength W1 [nm] as first pulses P1 having a predetermined frequency (e.g. 2 kHz) (see FIG. 7). The first pulses P1 are provided to the first acousto-optical modulator (AOM) 12a of the optical path determining section. The timing control circuit 19 controls the timing of the output from the optical path determining section (see P2a in FIG. 7).

At the time the optical path determining section receives (1+3N)-numbered (1st, 4th, 7th . . . ) ones (where N represents an integer equal to or greater than 0) of the first pulses P1, no acoustic wave is provided to the first acousto-optical modulator (AOM) 12a, while an acoustic wave is provided to the second acousto-optical modulator (AOM) 12b. The (1+3N)-numbered ones of the first pulses P1 then travel through the optical path OP1 (see FIG. 12). This causes light beams traveling through the optical path OP1 to be second pulses (before wavelength conversion) P2a having a frequency (⅔ kHz) obtained by dividing the predetermined frequency (e.g. 2 kHz) by the number (three) of the multiple optical paths (see FIG. 7).

At the time the optical path determining section receives (2+3N)-numbered (2nd, 5th, 8th . . . ) ones of the first pulses P1, an acoustic wave is provided to the first acousto-optical modulator (AOM) 12a, while no acoustic wave is also provided to the second acousto-optical modulator (AOM) 12b. The (2+3N)-numbered ones of the first pulses P1 then travel through the optical path OP2 (see FIG. 12). This causes light beams traveling through the optical path OP2 to be second pulses (before wavelength conversion) P2a having a frequency (⅔ kHz) obtained by dividing the predetermined frequency (e.g. 2 kHz) by the number (three) of the multiple optical paths (see FIG. 7).

At the time the optical path determining section receives (3+3N)-numbered (3rd, 6th, 9th . . . ) ones of the first pulses P1, no acoustic wave is provided to the first acousto-optical modulator (AOM) 12a and no acoustic wave is also provided to the second acousto-optical modulator (AOM) 12b. The (3+3N)-numbered ones of the first pulses P1 then travel through the optical path OP3 (see FIG. 12). This causes light beams traveling through the optical path OP3 to be second pulses (before wavelength conversion) P2a having a frequency (⅔ kHz) obtained by dividing the predetermined frequency (e.g. 2 kHz) by the number (three) of the multiple optical paths (see FIG. 7).

In addition, the phase of the light beams traveling through the optical path OP1 and going through the convex lens 13 (second pulses (before wavelength conversion) P2a) is 120-degree different from the phase of the light beams traveling through the optical path OP2 and going through the convex lens 13 (second pulses (before wavelength conversion) P2a). The phase of the light beams traveling through the optical path OP2 and going through the convex lens 13 (second pulses (before wavelength conversion) P2a) is 120-degree different from the phase of the light beams traveling through the optical path OP3 and going through the convex lens 13 (second pulses (before wavelength conversion) P2a). The phase of the light beams traveling through the optical path OP1 and going through the convex lens 13 (second pulses (before wavelength conversion) P2a) is 240-degree different from the phase of the light beams traveling through the optical path OP3 and going through the convex lens 13 (second pulses (before wavelength conversion) P2a).

Since the operation subsequent to that above is identical to that of the third embodiment, the description thereof will be omitted.

In accordance with the sixth embodiment, using the two acousto-optical modulators (the first acousto-optical modulator (AOM) 12a and the second acousto-optical modulator (AOM) 12b) instead of the acousto-optical deflector 120 in the third embodiment allows for irradiation with pulsed light of three wavelengths, as is the case in the third embodiment. It is noted that the (two) acousto-optical modulators are easier to mount in the laser beam output apparatus 1 at lower cost than the acousto-optical deflector. It is noted that no multiplexer (e.g. dichroic mirror) is required as is the case in the third embodiment.

Also, in the sixth embodiment, like the third embodiment, all of the polarization reversed sections 144 may be formed in the single LN crystal substrate 142.

It is noted that the sixth embodiment may have the following variation as to the operation of the optical path determining section (the first acousto-optical modulator (AOM) 12a and the second acousto-optical modulator (AOM) 12b).

Figure 15:
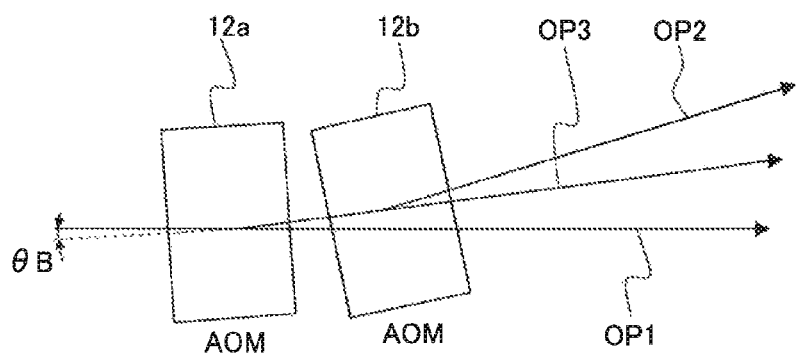
FIG. 15 is an enlarged view around the optical path determining section (the first acousto-optical modulator (AOM) 12a and the second acousto-optical modulator (AOM) 12b) in the laser beam output apparatus 1 according to a variation of the sixth embodiment.

FIG. 15 is an enlarged view around the optical path determining section (the first acousto-optical modulator (AOM) 12a and the second acousto-optical modulator (AOM) 12b) in the laser beam output apparatus 1 according to a variation of the sixth embodiment.

The first acousto-optical modulator (AOM) 12a is arranged to receive the first pulses P1 and determine one among multiple optical paths OP1, OP3 for each of the first pulses P1 for output. For example, the first acousto-optical modulator (AOM) 12a is arranged to diffract (optical path OP3) or directly advance (optical path OP1) each of the first pulses P1 for output.

The second acousto-optical modulator (AOM) 12b is here arranged to receive the output from the first acousto-optical modulator (AOM) 12a and determine one among one or more optical paths OP1, OP2, OP3 for each of the pulses of the output from the first acousto-optical modulator (AOM) 12a for output. In the variation of the sixth embodiment, the second acousto-optical modulator (AOM) 12b is arranged to receive and directly advance (optical path OP1) ("not diffract", which differs from the sixth embodiment) the directly advanced ones (optical path OP1) of the first pulses for output, while receive and diffract (optical path OP2) or directly advance (optical path OP3) ("diffract", which differs from the sixth embodiment) the diffracted ones (optical path OP3) of the first pulses for output.

It is noted that the shorter sides of the second acousto-optical modulator (AOM) 12b are inclined θB (Bragg's angle) counterclockwise with respect to the optical path OP3.

DESCRIPTION OF REFERENCE NUMERAL

P1 First Pulses
P2a Second Pulses (before Wavelength Conversion)
P2b Second Pulses (after Wavelength Conversion)
P3 Third Pulses
OP1, OP2, OP3 Optical Path
1 Laser Beam Output Apparatus
10 Pumping Laser (Pulsed Laser Output Section)
11 Optical Attenuator (ATT)
Acousto-Optical Modulator (Optical Path Determining Section) (AOM)
12a First Acousto-Optical Modulator (AOM)
12b Second Acousto-Optical Modulator (AOM)
120 Acousto-Optical Deflector (AOD) (Optical Path Determining Section)
13 Convex Lens (Parallelizing Section) (L1)
14, 14a, 14b Wavelength Changing Section (PPLN)
142 LN Crystal Substrate
144 Polarization Reversed Sections
16 Achromatic Lens (Focusing Section) (L2)
16a Convex Lens
16b Concave Lens
17 Filter (F)
18 Optical Fiber (MMF)
18c Core
18E End Face
19 Timing Control Circuit (Timing Control Section)

What is claimed is:

1. A laser beam output apparatus, comprising:
   a pulsed laser output section that outputs a laser beam having a predetermined wavelength as first pulses;
   an optical path determining section that receives the first pulses and determines one among a plurality of optical paths for each of the first pulses for output;
   a parallelizing section that parallelizes a traveling direction of light beams traveling, respectively, through the plurality of optical paths;
   a wavelength changing section that receives outputs from the parallelizing section and changes the outputs to have different wavelengths for output;
   a focusing section that receives and focuses outputs from the wavelength changing section;
   an optical fiber that receives an output from the focusing section at a core end face; and
   a timing control section arranged to time outputs from the optical path determining section to the output of the first pulses, wherein
   the focusing section is arranged to focus the outputs from the wavelength changing section on the core end face.

2. The laser beam output apparatus according to claim 1, wherein
   the parallelizing section is a convex lens.

3. The laser beam output apparatus according to claim 2, wherein
   one of outputs from the optical path determining section passes through an optical axis of the parallelizing section.

4. The laser beam output apparatus according to claim 1, wherein
the focusing section is a convex lens.

5. The laser beam output apparatus according to claim 4, wherein
NA>Ymax/(2f), where f represents a focal length of the focusing section, Ymax represents a maximum distance between the outputs from the parallelizing section, and NA represents a numerical aperture of the optical fiber.

6. The laser beam output apparatus according to claim 1, wherein
the focusing section is an achromatic lens.

7. The laser beam output apparatus according to claim 6, wherein
NA>Ymax/(2f), where f represents the focal length of the focusing section, Ymax represents a maximum distance between the outputs from the parallelizing section, and NA represents a numerical aperture of the optical fiber.

8. The laser beam output apparatus according to claim 1, wherein
the wavelength changing section has polarization reversed sections through which the outputs from the parallelizing section propagate, the polarization reversed sections being arranged at a predetermined spacing, and
the predetermined spacing varies depending on the outputs from the parallelizing section.

9. The laser beam output apparatus according to claim 8, wherein
the wavelength changing section has a non-linear optical crystal substrate with the polarization reversed sections formed thereon, and
graphical centers of the polarization reversed sections are arranged on a straight line parallel to an X axis of the non-linear optical crystal substrate.

10. The laser beam output apparatus according to claim 8, wherein
the wavelength changing section has a single non-linear optical crystal substrate with all of the polarization reversed sections formed thereon.

11. The laser beam output apparatus according to claim 10, wherein
all of the outputs from the parallelizing section pass through shared polarization reversed sections.

12. The laser beam output apparatus according to claim 8, wherein
the wavelength changing section has a non-linear optical crystal substrate with the polarization reversed sections formed thereon, and
the non-linear optical crystal substrate is provided for each of the outputs from the parallelizing section propagating therethrough.

13. The laser beam output apparatus according to claim 1, wherein
the optical path determining section has:
a first acousto-optical modulator arranged to receive the first pulses and determine one among the plurality of optical paths for each of the first pulses for output; and
a second acousto-optical modulator arranged to receive output pulses from the first acousto-optical modulator and determine one among one or more optical paths for each of the output pulses from the first acousto-optical modulator for output.

14. The laser beam output apparatus according to claim 13, wherein
the first acousto-optical modulator is arranged to diffract or directly advance each of the first pulses for output, and
the second acousto-optical modulator is arranged to receive and diffract or directly advance directly advanced ones of the first pulses for output, while receiving and directly advancing diffracted ones of the first pulses for output.

15. The laser beam output apparatus according to claim 13, wherein
the first acousto-optical modulator is arranged to diffract or directly advance each of the first pulses for output, and
the second acousto-optical modulator is arranged to receive and diffract or directly advance diffracted ones of the first pulses for output, while receiving and directly advancing directly advanced ones of the first pulses for output.

\* \* \* \* \*